United States Patent
Ishiguro et al.

(10) Patent No.: US 6,916,521 B2
(45) Date of Patent: Jul. 12, 2005

(54) CLEANING MEDIUM FOR MAGNETIC RECORDING APPARATUS

(75) Inventors: Tadashi Ishiguro, Kanagwa (JP); Yutaka Kakuishi, Kanagwa (JP); Satoru Hayakawa, Kanagwa (JP); Minoru Sueki, Kanagwa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 182 days.

(21) Appl. No.: 10/021,747

(22) Filed: Dec. 13, 2001

(65) Prior Publication Data

US 2002/0106497 A1 Aug. 8, 2002

(30) Foreign Application Priority Data

Dec. 13, 2000 (JP) .................................. P.2000-378956
Jan. 30, 2001 (JP) .................................. P.2001-021718

(51) Int. Cl.$^7$ ............................................. G11B 5/733
(52) U.S. Cl. ................. 428/141; 428/212; 428/323; 428/327; 428/341; 428/342; 428/340; 428/694 BP; 428/694 BR; 365/200; 360/134; 360/131
(58) Field of Search ................................ 428/141, 212, 428/323, 327, 341, 342, 340, 694 BL, 694 BN, 694 BR, 694 BP; 365/200; 360/134, 131

(56) References Cited

U.S. PATENT DOCUMENTS

| | | | | |
|---|---|---|---|---|
| 4,439,795 A | * | 3/1984 | Kitamoto et al. | 360/131 |
| 5,254,404 A | * | 10/1993 | Hashimoto et al. | 428/323 |
| 5,489,466 A | * | 2/1996 | Inaba et al. | 428/212 |
| 5,530,609 A | * | 6/1996 | Koga et al. | 360/131 |
| 5,747,157 A | * | 5/1998 | Hashimoto et al. | 428/332 |
| 6,030,689 A | * | 2/2000 | Matsubaguchi et al. | 428/141 |
| 6,124,030 A | * | 9/2000 | Suzuki et al. | 428/328 |
| 6,203,884 B1 | * | 3/2001 | Sato et al. | 428/141 |
| 6,607,806 B2 | * | 8/2003 | Kato et al. | 428/141 |

FOREIGN PATENT DOCUMENTS

| | | |
|---|---|---|
| JP | 10-289428 | 10/1998 |

* cited by examiner

Primary Examiner—Rena Dye
Assistant Examiner—Tamra L. Dicus
(74) Attorney, Agent, or Firm—Stroock & Stroock & Lavan LLP

(57) ABSTRACT

A cleaning medium for a magnetic recording apparatus is disclosed, comprising a nonmagnetic support having provided thereon a lower coating layer mainly containing a nonmagnetic inorganic powder and a binder, and a cleaning layer containing at least a ferromagnetic inorganic powder and a binder provided on the lower coating layer, wherein the thickness of the cleaning layer is from 0.05 to 1.0 μm, the thickness of the lower coating layer is from 0.2 to 5.0 μm, the thickness of the support is from 2.0 to 10 μm, and the thickness in total of the cleaning medium (cleaning tape) is from 4.0 to 15 μm.

6 Claims, No Drawings

CLEANING MEDIUM FOR MAGNETIC RECORDING APPARATUS

FIELD OF THE INVENTION

The present invention relates to a cleaning medium, such as a cleaning tape, for magnetic recording apparatus for cleaning a magnetic head or a running system used in magnetic recording and reproducing apparatus for the audio, the video recorder and the computer.

BACKGROUND OF THE INVENTION

Recording and reproduction of magnetic recording apparatus for the audio, the video recorder and the computer are generally performed by sliding a magnetic head and a magnetic medium, e.g., a magnetic tape, with keeping them in contact each other. At this time, reproduction output lowers if the scratched powders of the magnetic tape and the dusts in the peripheral of the recording apparatus are adhered to the surface of the magnetic head, and output cannot be obtained at all in the end. For recovering the reproduction output lowered in such a way, a cleaning medium, such as a cleaning tape, is used to restore the reproduction output by cleaning the stain adhered on the surface of the magnetic head.

On the other hand, magnetic recording becomes more and more higher density, and so it is difficult to accomplish satisfactory recording and reproduction if the tip of a magnetic head and a magnetic tape are not in contact well with each other. For maintaining good touch of a magnetic tape with a magnetic head, a cleaning tape is required not only to clean stain on a magnetic head but also to adjust the form of the head to a certain degree. In particular, a magnetic head of a magnetic recorder for high density recording of the shortest recording wavelength of 1 $\mu$m or less is used in recent years, and the gap length in this magnetic head is 0.4 $\mu$m or less, therefore a trace of stain on the head will interfere with recording and reproducing performance.

Further, ferrite having a high surface hardness has been mainly used as the material of a magnetic head, but a metal head such as Sendust has come into use for the advancement in high density. Since a metal head is soft as compared with a ferrite head and the abrasion of the head is large, it becomes important that the amount of head abrasion due to a cleaning tape is small.

Further, with the tendency of high density recording, an MR head (Magnetic Resistive Head) has come into use. The height of a shield type MR head element for general use is several micrometers or less, thus the amount of head abrasion of MR head has to be small as far as possible as compared with a ferrite head and a Sendust head.

Further, magnetic recorders capable of using both a metal vapor deposition tape (ME tape) and a metal powder tape (MP tape) such as Hi-8 and DVC have appeared on the market. With the vapor deposition tape, since a metal thin film having high stiffness is brought into contact with a magnetic head, it is difficult to obtain a good contact condition, i.e., recording and reproducing performance, if the tip of the magnetic head is not acute. In addition, since the vapor deposition tape does not contain an abrasive, magnetic head abrasion due to contact with the tape is little, so that the conformability to the magnetic head is low. On the other hand, since the magnetic layer of the metal tape contains a magnetic powder in a binder, the touch of the magnetic tape to the magnetic head is soft, thus the touch of the tape to the head is not so influenced according to the form of tip of the head, and the conformability to the magnetic head is good due to its abrading force.

Accordingly, when the metal tape is run to the magnetic head after the vapor deposition tape has been run, the touch of the tape to the head is not so influenced, contrary to this, when the vapor deposition tape is run after the metal tape has been run, there are cases where the touch of the tape to the head results in a disorder.

As the prior technique of the abrasive tape for abrading a magnetic head, e.g., an abrasive tape comprising a nonmagnetic support having provided thereon an intermediate layer containing a nonmagnetic powder and an abrasive layer containing a nonmagnetic abrasive laminated in this order from the support is disclosed in JP-A-62-92205 (the term "JP-A" as used herein means an "unexamined published Japanese patent application"). This abrasive tape takes two-layer constitution, and contrives to prevent scratches of a head from occurring while maintaining the abrasive force by making the surface of the intermediate layer coarse on the one hand and making the particle size of the abrasive particles in the upper abrasive layer fine on the other hand. However, this abrasive tape is for finishing abrasion of a magnetic head, a head is too much abraded as can be seen from its surface roughness of from 0.03 to 0.3 $\mu$m, and it is difficult to perform proper abrasion as cleaning, and so this tape is not suitable for a cleaning tape. Abrasive tapes similar to the above tape are disclosed in JP-A-62-94270 and JP-A-62-92205. These tapes also have an abrasive layer of two-layer constitution, but it is difficult to perform good cleaning without scratching a magnetic head by proper abrasion, therefore they are not suitable for a cleaning medium.

With respect to an MR head, as compared with a ferrite head and a metal head, e.g., a Sendust head, there is such a problem that head abrasion must be lessened as far as possible, and the effective means for solving this problem has been required.

As a cleaning tape for a magnetic head, a technique of two-layer constitution comprising a flexible support having provided thereon two cleaning layers, which Young's modulus of the upper cleaning layer is made larger than that of the lower cleaning layer which is compatible with good cleaning property and less head abrasion is disclosed in JP-A-6-139531. However, according to this technique, since both of two layers contain a ferromagnetic powder, the anisotropy of Young's modulus of the tape as a whole is conspicuously generated. Hence it is difficult to exhibit good cleaning property to each form when the forms of the magnetic head are different after a metal tape and a vapor deposition tape are used. In particular, the form of the tip of the head after cleaning is not acute, and so good touch of the vapor deposition tape to the head cannot be brought about, and the recovery of interchangeability of a metal tape and a vapor deposition tape is insufficient.

It has been found that, even if a magnetic head is different in forms, the touch of the vapor deposition tape to the head can be made good and the interchangeability of a metal tape and a vapor deposition tape can be sufficiently recovered if the stain on the magnetic head can be removed with a cleaning medium having proper flexibility and good surface property and, at the same time, if the form of the magnetic head can be adjusted.

Accordingly, in cleaning a magnetic head of a high density magnetic recording and reproducing apparatus, the present inventors provided a cleaning medium for a magnetic recording medium capable of sliding along with the contour of a head causing less head abrasion, capable of using in a metal head, capable of doing good cleaning irrespective of the form of a magnetic head, capable of adjusting the form of a magnetic head without scratching the tip of the head after cleaning, and having good interchangeability. This cleaning medium for a magnetic recording apparatus comprises a nonmagnetic support having provided thereon a lower coating layer mainly containing a nonmagnetic inorganic powder and a binder, and a cleaning layer containing at least a ferromagnetic inorganic powder and a binder provided on the lower coating layer, wherein the binder in the lower coating layer is a polyurethane resin which is a reaction product containing at least diol and organic diisocyanate as main starting materials, and the polyurethane resin contains short chain diol having a cyclic structure and long chain diol containing an ether group. However, the strength of the coated film was insufficient because the dispersibility of the nonmagnetic inorganic powder was not sufficient, and so cleaning effect was not satisfactory.

SUMMARY OF THE INVENTION

Accordingly, an object of the present invention is to provide a cleaning medium for a magnetic recording apparatus which has high cleaning power to a magnetic head, does not scratch a magnetic head such as an MR head, and does not abrade a head.

The above object of the present invention has been attained by the following means.

(1) A cleaning medium for a magnetic recording apparatus comprising a nonmagnetic support having provided thereon a lower coating layer mainly containing a nonmagnetic inorganic powder and a binder, and a cleaning layer containing at least a ferromagnetic inorganic powder and a binder provided on the lower coating layer, wherein the thickness of the cleaning layer is from 0.05 to 1.0 $\mu$m, the thickness of the lower coating layer is from 0.2 to 5.0 $\mu$m, the thickness of the support is from 2.0 to 10 $\mu$m, and the thickness in total of the cleaning medium (cleaning tape) is from 4.0 to 15 $\mu$m.

(2) The cleaning medium for a magnetic recording apparatus as described in the above item (1), wherein the binder in the lower coating layer comprises a polyurethane resin which is a reaction product containing polyol and organic diisocyanate as the main starting materials, and the polyurethane resin contains, as the polyol components, from 15 to 40 wt % of a short chain diol component having a cyclic structure, from 10 to 50 wt % of a long chain polyether polyol component, and a polar group-containing long chain polyol component having a molecular weight of from 500 to 5,000.

(3) The cleaning medium for a magnetic recording apparatus as described in the above item (1), wherein the surface of the cleaning layer has from 5 to 80 protrusions having a height of from 35 to 100 nm per 900 $\mu$m$^2$, and the cleaning layer contains fatty acid amide, fatty acid and fatty acid ester.

(4) The cleaning medium for a magnetic recording apparatus as described in the above item (2), wherein the polar group-containing long chain polyol component in the polyurethane resin contains polar groups in an amount of from $1 \times 10^{-5}$ eq/g to $2 \times 10^{-4}$ eq/g based on the polyurethane resin.

(5) The cleaning medium for a magnetic recording apparatus as described in the above item (2), wherein the polar group-containing long chain polyol component contains at least one polar group selected from the group consisting of —SO$_3$M, —OSO$_3$M, —COOM, —PO$_3$M$_2$, —OPO$_3$M$_2$, —NR$_2$ and —N$^+$R$_2$R'COO$^-$ (wherein M represents a hydrogen atom, an alkali metal, an ammonium, and R and R' each represents an alkyl group having from 1 to 12 carbon atoms).

(6) The cleaning medium for a magnetic recording apparatus as described in the above item (2), wherein the polyurethane resin has from 3 to 20 OH groups per one molecule.

(7) The cleaning medium for a magnetic recording apparatus as described in the above item (2), wherein the cleaning layer is formed on the lower coating layer by a wet-on-wet coating method while the lower coating layer is still wet.

DETAILED DESCRIPTION OF THE INVENTION

The cleaning medium according to the present invention basically comprises a nonmagnetic support having provided thereon a lower coating layer mainly containing a nonmagnetic inorganic powder and a binder, and a cleaning layer containing at least a ferromagnetic inorganic powder and a binder provided on the lower coating layer.

The cleaning layer has a thickness of from 0.05 to 1.0 $\mu$m, the lower coating layer has a thickness of from 0.2 to 5.0 $\mu$m, the support has a thickness of from 2.0 to 10 $\mu$m, and the cleaning medium (i.e., cleaning tape) has a thickness in total of from 4.0 to 15 $\mu$m. The central line average surface roughness (Ra) defined in JIS B0601 of the cleaning layer is preferably from 1.0 to 8.0 nm, and the central line average surface roughness (Ra) of the surface of the support is preferably from 0.5 to 7.0 nm. The cut-off value for the Ra is 0.08 mm.

Concerning the constitution of the thickness of the cleaning tape of the present invention, the nonmagnetic support as thin as from 2.0 to 10 $\mu$m is effective. The total thickness of the cleaning layer and the lower coating layer is from 1/100 to twice the thickness of the support.

An adhesive layer may be provided between the nonmagnetic support and the lower coating layer for improving adhesion. The thickness of the adhesive layer is from 0.01 to 2 $\mu$m, preferably from 0.02 to 0.5 $\mu$m. Further, a back coat layer may be provided on the back surface of the support which is opposite to the side on which the cleaning layer is provided. The thickness of the back coat layer is from 0.1 to 2 $\mu$m, preferably from 0.3 to 1.0 $\mu$m. Well-known adhesive layers and back coat layers may be used as these adhesive layer and back coat layer.

The lower coating layer is described in detail below.

Due to the use of from 15 to 40 wt % of a short chain diol component having a cyclic structure, from 10 to 50 wt % of a long chain polyether polyol component, and a polar group-containing long chain polyol component having a molecular weight of from 500 to 5,000 as the polyol components in the lower coating layer according to the present invention, in particular due to the use of a polar group-containing long chain polyol component having a molecular weight of from 500 to 5,000, the dispersibility of the nonmagnetic inorganic powder is further improved, as a result, the surface property of the cleaning layer coated as the upper layer is further improved. Therefore, the amount of head abrasion can be reduced without scratching the magnetic head. Further, the strength of the coated film is further heightened by using the above binder, and the cleaning tape of the present invention can exhibit excellent cleaning power even when the temperature increases by the friction at magnetic head cleaning.

In well-known polyurethanes, the solubility in a solvent lowers when the concentrations of cyclic structure and urethane bonding increase, as a result the dispersibility of the nonmagnetic inorganic powder lowers, the smoothness of the lower coating layer lowers and the smoothness of the upper cleaning layer also lowers. Contrary to this, the polyurethane according to the present invention is advantageous in that it is excellent in the solubility in a solvent and also excellent in dispersibility. This is presumably due to the fact that the dispersibility can be improved because the polyurethane can be easily adsorbed onto the nonmagnetic powder without reducing the solubility in a solvent, as a trace amount of hydrophilic ether group and a polar group-containing long chain polyol component are contained in the polyurethane according to the present invention. Further, since the lower coating layer can also provide a proper elasticity by the above constitution, the coated film as a whole does not brittle, and so repeating running property is not reduced.

Further, when cleaning is performed by sliding the cleaning layer of the cleaning medium of the present invention with keeping in contact with the surface of the magnetic head, good cleaning effect can be obtained by the flexibility which is isotropic in strength and moderate as a whole even if the magnetic head is different in forms. That is, since the nonmagnetic inorganic powder in the lower coating layer is not oriented to the cleaning layer containing a ferromagnetic powder, they are isotropic in strength. By taking such a constitution, the surface properties of the cleaning layer of the cleaning medium and the contact condition to the magnetic head become excellent, the abrasion of the magnetic head is reduced, and the cleaning properties of removing the stain on the magnetic head within a short period of time can be obtained.

That is, the binder for use in the lower coating layer of the present invention preferably comprises a polyurethane resin which is a reaction product containing at least polyol and organic diisocyanate as the main starting materials, and the polyurethane resin contains, as the polyol components, from 15 to 40 wt % of a short chain diol component having a cyclic structure, from 10 to 50 wt % of a long chain polyether polyol component, and a polar group-containing long chain polyol component having a molecular weight of from 500 to 5,000. The polyurethane resin is described below.

As the short chain diol component having a cyclic structure which is a starting material of the polyurethane resin, the compounds capable of being selected from diols having an aromatic or alicyclic group, such as bisphenol A, hydrogenated bisphenol A, bisphenol S, hydrogenated bisphenol S, bisphenol P, hydrogenated bisphenol P, cyclohexanedimethanol, cyclohexanediol, and hydroquinone, and the ethylene oxide adducts and propylene oxide adducts of them and having a molecular weight of less than 500 are preferred. Of these, bisphenol A, hydrogenated bisphenol A, and the ethylene oxide adducts, and propylene oxide adducts, of them are preferred. Hydrogenated bisphenol A is more preferred. The content of the short chain diol component having a cyclic structure in the polyurethane resin is from 15 to 40 wt %, preferably from 20 to 35 wt %, and more preferably from 22 to 30 wt %. When the content is less than 15 wt %, the coated film to be obtained becomes too soft and sufficient strength cannot be obtained and still durability is reduced. While when the content exceeds 40 wt %, the solubility in a solvent is reduced, the dispersibility of the ferromagnetic inorganic powder is reduced, and magnetic recording medium which is excellent in electromagnetic characteristics cannot be obtained.

As the long chain polyether polyol component which is a starting material of the polyurethane resin, polyalkylene glycol, e.g., polypropylene glycol, polyethylene glycol and polytetramethylene glycol, and polyether polyols obtained by adding polyethylene oxide or polypropylene oxide to cyclic diols such as bisphenol A, hydrogenated bisphenol A, bisphenol S, or bisphenol P are used. Propylene oxide adducts of bisphenol A, ethylene oxide adducts of bisphenol A, ethylene oxide adducts of hydrogenated bisphenol A, and propylene oxide adducts of hydrogenated bisphenol A are preferably used. The molecular weight of the long chain polyether polyol component is from 500 to 5,000, preferably from 600 to 3,000. When the molecular weight is 5,000 or higher, the glass transition temperature of the coated film is lowered, the strength is lowered, and the durability is lowered.

The content of the ether group in the polyurethane resin is preferably from 1 to 5 mmol/g, particularly preferably from 2 to 4 mmol/g. When the content of the ether group is less than 1 mmol/g, the adsorption property to the nonmagnetic inorganic powder is reduced, as a result the dispersibility is reduced. When the content is higher than 5 mmol/g, the solubility in a solvent is reduced, as a result the dispersibility is reduced. As the polyurethane resin according to the present invention has a cyclic structure, the present invention is high in the strength of a coated film, excellent in durability, high in the solubility in a solvent, and excellent in dispersibility.

The polar group of the polar group-containing long chain polyol component which is a starting material of the polyurethane resin is selected from the group consisting of $-SO_3M$, $-OSO_3M$, $-COOM$, $-PO_3M_2$, $-OPO_3M_2$, $-NR_2$ and $-N^+R_2R'COO^-$ (wherein M represents a hydrogen atom, an alkali metal, an ammonium, and R and R' each represents an alkyl group having from 1 to 12 carbon atoms). As the polyol skeletal structure, polyester polyol, polyether polyol, polyether ester polyol and polycarbonate polyol are used. The specific examples of the polar group-containing long chain polyol components include polar group-containing polyester polyols obtained by dehydrocondensation of dicarboxylic acid or glycol having a polar group, such as sodium 5-sulfoisophthalate, potassium 5-sulfoisophthalate, sodium sulfoterephthalate, potassium terephthalate, sodium 2-sulfo-1,4-butanediol, potassium 2-sulfo-1,4-butanediol, sodium bis(2-hydroxyethyl) phosphinate, dimethylolpropionic acid, sodium dimethylolpropionate or sodium sulfosuccinate with other glycol or dicarboxylic acid; polar group-containing polyester polyols obtained by ring opening polymerization of lactone such as ε-caprolactone with the above polar group-containing diol as the initiator; and polar group-containing polyether diols obtained by adding alkylene oxide such as ethylene oxide or propylene oxide to polar group-containing diol.

Examples of other glycols for use in the above polyester polyols include aliphatic glycols, e.g., ethylene glycol, 1,3-propylenediol, propylene glycol, neopentyl glycol, 1,4-butanediol, 1,5-pentanediol, 1,6-hexanediol, 1,8-octanediol, 1,9-nonanediol, diethylene glycol and dipropylene glycol, and alicyclic glycols, e.g., cyclohexanediol and cyclohexanedimethanol. As other dicarboxylic acids, aliphatic and aromatic dicarboxylic acids, such as succinic acid, adipic acid, sebacic acid, azelaic acid, phthalic acid, isophthalic acid, terephthalic acid, and naphthalenedicarboxylic acid are used.

Of the above-described polar group-containing long chain polyol components, the preferred examples include, e.g., polyester polyols obtained by dehydrocondensation of sodium 5-sulfoisophthalate/isophthalic acid/neopentyl glycol, polyester polyols obtained by ring opening polymerization of ε-caprolactone with ethylene oxide adducts of potassium 5-sulfoisophthalate as the initiator, and polyether polyols obtained by the addition of propylene oxide to sodium 2-sulfo-1,4-butanediol. The molecular weight of the polar group-containing long chain polyol component is from 500 to 5,000, preferably from 600 to 2,500. By introducing a polar group into the polyurethane with these polyols, the distribution of the polar group in the polyurethane molecules becomes small, and so the dispersibility and the dispersion stability are improved. When the molecular weight of the polar group-containing long chain polyol component is too large, the amount of the polar groups which can be introduced into the polyurethane becomes little, thus the dispersibility lowers. The polar groups are preferably contained in the polyurethane resin in an amount of from $1 \times 10^{-5}$ to $2 \times 10^{-4}$ eq/g based on the polyurethane resin. When the amount of polar groups is too large, the viscosity of the solution increases due to the association between polar groups and the dispersibility is liable to be reduced.

The glass transition temperature (Tg) of the polyurethane resin is preferably from 45 to 120° C., more preferably from 50 to 90° C. When the glass transition temperature is higher than this range, the strength of the coated film is small and the running durability is reduced, while when it is higher than 120° C., film-forming property by calendering is reduced and the electromagnetic characteristics decrease. The weight average molecular weight of the polyurethane resin is from 10,000 to 200,000, preferably from 10,000 to 100,000, more preferably from 20,000 to 80, 000, and particularly preferably from 30,000 to 70,000. When the weight average molecular weight is smaller than 10,000, the strength of the coated film is deteriorated and the running durability is inferior. When the weight average molecular weight is greater than 200,000, the solubility in a solvent lowers and the dispersibility is liable to decrease.

As the short chain diol for use in the polyurethane resin, other diols besides the above diols can be used in combination. The specific examples of such diols include aliphatic and alicyclic diols, e.g., ethylene glycol, 1,3-propylenediol, 1,2-propylene glycol, 1,4-butanediol, 1,5-pentanediol, 1,6-hexanediol, 2,2-dimethylpropanediol, 1,8-octanediol, 1,9-nonanediol, diethylene glycol, cyclohexane-1,4-diol, and cyclohexane-1,4-dimethanol.

The examples of the organic diisocyanate compounds which are contained in the polyurethane resin as the starting material include aromatic diisocyanate, e.g., 2,4-tolylenediisocyanate, 2,6-tolylenediisocyanate, xylene-1,4-diisocyanate, xylene-1,3-diisocyanate, 4,4'-diphenylmethanediisocyanate, 4,4-diphenyl ether diisocyanate, 2-nitrodiphenyl-4,4'-diisocyanate, 2,2'-diphenylpropane-4,4'-diisocyanate, 4,4'-diphenylpropanediisocyanate, m-phenylenediisocyanate, p-phenylenediisocyanate, naphthylene-1,4-diisocyanate, naphthylene-1,5-diisocyanate and 3,3'-dimethoxydiphenyl-4,4'-diisocyanate, aliphatic diisocyanate, e.g., tetramethylenediisocyanate, hexamethylenediisocyanate, and lysinediisocyanate, and alicyclic diisocyanate, e.g., isophoronediisocyanate, hydrogenated tolylenediisocyanate and hydrogenated diphenylmethanediisocyanate. It is preferred that these diisocyanate compounds are contained in the binder of the polyurethane resin in an amount of from 10 to 50 wt %, more preferably from 20 to 40 wt %.

Vinyl chloride synthetic resins may be used in the polyurethane resin in combination. The polymerization degree of the vinyl chloride series resins which can be used in combination is preferably from 100 to 600, more preferably from 200 to 450. The vinyl chloride resins may be the products obtained by copolymerization of vinyl monomers, e.g., vinyl acetate, vinyl alcohol, vinylidene chloride, or acrylonitrile. Cellulose derivatives such as nitrocellulose, acrylic resins, polyvinyl acetal resins, polyvinyl butyral resins, epoxy resins, or phenoxy resins may be used in combination, and they can be used alone or in combination of two or more. When other synthetic resins are used in combination, the polyurethane resin is contained in the binder preferably in an amount of from 10 to 100 wt %, more preferably from 20 to 100 wt %, and particularly preferably from 50 to 100 wt %. When the amount of the polyurethane resin is less than 10 wt %, the solubility in a solvent is reduced and the dispersibility is reduced.

The content of the vinyl chloride resin in the binder is preferably from 10 to 80 wt %, more preferably from 20 to 70 wt %, and particularly preferably from 30 to 60 wt %. A curing agent can be used in the lower coating layer together with the binder. Polyisocyanate curing agents and epoxy curing agents are used as the curing agent but polyisocyanate curing agents are preferred. The examples of polyisocyanate curing agents include organic diisocyanate compounds, the reaction products of the above diisocyanates and trimethylolpropane, hydric alcohols such as glycerin, e.g., the reaction products of 3 mols of tolylenediisocyanate and 1 mol of trimethylolpropane, 3 mols of xylylenediisocyanate or hexamethylenediisocyanate and 1 mol of trimethylolpropane are exemplified. In addition to the above, as the isocyanurate type polyisocyanate, trimers, pentamers and heptamers such as tolylenediisocyanate and hexamethylenediisocyanate obtained by polymerization of diisocyanate compounds, and polymeric MDI which is a polymer of MDI can be exemplified. When curing treatment is performed by electron beam irradiation, compounds having a reactive double bond, such as urethane acrylate, can be used.

The polyisocyanate compounds contained in the lower coating layer is preferably contained in the binder in an amount of from 10 to 50 wt %, more preferably from 20 to 40 wt %. When curing treatment is performed by electron beam irradiation, compounds having a reactive double bond, such as urethane acrylate, can be used.

The total weight of the resin component and the curing agent (i.e., the binder) is preferably from 15 to 40 weight parts, more preferably from 20 to 30 weight parts, per 100 weight parts of the nonmagnetic inorganic powder.

Nonmagnetic inorganic powders for use in the lower coating layer can be selected from inorganic compounds such as metallic oxide, metallic carbonate, metallic sulfate, metallic nitride, metallic carbide and metallic sulfide.

The inorganic compounds are selected from the following compounds and they can be used alone or in combination, e.g., α-alumina having an alpha-conversion rate of 90% or more, β-alumina, γ-alumina, θ-alumina, silicon carbide, chromiumoxide, ceriumoxide, α-ironoxide, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred, because they are easily available and inexpensive, they have small particle size distribution, and various means can be used for providing functions, and titanium dioxide and α-iron oxide are more preferred.

These nonmagnetic inorganic powders preferably have an average particle size of from 0.005 to 2 μm. If desired, a plurality of nonmagnetic inorganic powders each having different particle sizes may be used in combination, or a single nonmagnetic powder having a broad particle size distribution may be used so as to attain the same effect as such a combination. A particularly preferred particle size of nonmagnetic inorganic powders is from 0.01 to 0.2 μm. Nonmagnetic inorganic powders have a tap density of from 0.05 to 2 g/ml, preferably from 0.2 to 1.5 g/ml; a water content of from 0.1 to 5 wt %, preferably from 0.2 to 3 wt %, and more preferably from 0.3 to 1.5 wt %; a pH value of from 2 to 11, particularly preferably between 5 and 10; a specific surface area of from 1 to 100 m$^2$/g, preferably from 5 to 70 m$^2$/g, and more preferably from 10 to 65 m$^2$/g; a crystallite size of from 0.004 to 1 μm, and more preferably from 0.04 to 0.1 μm; an oil absorption amount using DEP of from 5 to 100 ml/100 g, preferably from 10 to 80 ml/100 g, and more preferably from 20 to 60 ml/100 g; and a specific gravity of from 1 to 12, preferably from 3 to 6. The shape of nonmagnetic inorganic powders may be any of acicular, spherical, polyhedral and tabular shapes. In the case of nonmagnetic inorganic particulate powders, it preferred to use the nonmagnetic inorganic powders having an average particle size of 0.08 μm or less in an amount of 50 wt % or more to the total weight of the inorganic powders, and in the case of nonmagnetic inorganic acicular powders, it preferred to use the nonmagnetic inorganic powders having an average long axis length of from 0.05 to 0.3 μm and an acicular ratio of from 3 to 20 in an amount of 50 wt % or more to the total weight of the inorganic powders.

Ignition loss of these nonmagnetic inorganic powders is preferably 20 wt % or less, and most preferably 0 wt %. Nonmagnetic inorganic powders for use in the present invention preferably have a Mohs' hardness of from 4 to 10. The roughness factor of the surfaces of these powders is preferably from 0.8 to 1.5, more preferably from 0.9 to 1.2. The SA (stearic acid) adsorption amount of inorganic powders is from 1 to 20 μmol/m$^2$, preferably from 2 to 15 μmol/m$^2$. The heat of wetting in water at 25° C. of the nonmagnetic inorganic powders in the lower coating layer is preferably from 200 to 600 mJ/m$^2$. Solvents in this range of the heat of wetting can be used in the present invention. The number of water molecules of the surfaces of the inorganic powders at 100 to 400° C. is preferably from 1 to $^{10}/_{100}$Å. The pH of the isoelectric point in water is preferably between 3 and 6.

The surfaces of these nonmagnetic inorganic powders are preferably covered with $Al_2O_3$, $SiO_2$, $TiO_2$, $ZrO_2$, $SnO_2$, $Sb_2O_3$, ZnO or $Y_2O_3$. $Al_2O_3$, $SiO_2$, $TiO_2$ and $ZrO_2$ are particularly preferred in the point of dispersibility, and $Al_2O_3$, $SiO_2$ and $ZrO_2$ are more preferred. They can be used in combination or may be used alone. A method in which the surface treatment maybe performed by coprecipitation, alternatively, particles may be previously covered with alumina, and then the alumina-covered surface may be covered with silica, or vice versa, according to purposes. The surface-covering layer may be porous layer, if necessary, but a homogeneous and dense surface is generally preferred.

The specific examples of the nonmagnetic inorganic powders for use in the lower coating layer according to the present invention include Nanotite (manufactured by Showa Denko Co., Ltd.), HIT-100 and ZA-G1 (manufactured by Sumitomo Chemical Co. ,Ltd.), α-hematite, DPN-250, DPN-250BX, DPN-245, DPN-270BX and DPN-500BX (manufactured by Toda Kogyo Co., Ltd.), titanium oxide TTO-51B, TTO-55A, TTO-55B, TTO-55C, TTO-55S, TTO-55D, SN-100, α-hematite E270, E271 and E300 (manufactured by Ishihara Sangyo Kaisha Ltd.), STT-4D, STT-30D, STT-30 and STT-65C (manufactured by Titan Kogyo Co., Ltd.), MT-100S, MT-100T, MT-150W, MT-500B, MT-600B, MT-100F and MT-500HD (manufactured by Teika Co., Ltd.), FINEX-25, BF-1, BF-10, BF-20 and ST-M (manufactured by Sakai Chemical Industry Co., Ltd.), DEFIC-Y and DEFIC-R (manufactured by Dowa Mining Co., Ltd.), AS2BM and $TiO_2$ P25 (manufactured by Nippon Aerosil Co., Ltd.), 100A and 500A (manufactured by Ube Industries, Ltd.), and Y-LOP and calcined products thereof (manufactured by Titan Kogyo Co., Ltd.).

Of described above, particularly preferred non-magnetic inorganic powders are α-iron oxide and titanium dioxide. α-Iron oxide (hematite) prepared on various conditions as described below can be used in the present invention. α-$Fe_2O_3$ powders are obtained from acicular goethite particles as precursor particles. Acicular goethite particles are prepared by any of the following methods. The first method is a method in which an alkali hydroxide aqueous solution is added to an aqueous ferrous iron solution in equivalent or more amount to thereby obtain a suspension having pH of 11 or more containing ferrous hydroxide colloid, then an oxygen-containing gas is aerated to the suspension obtained at 80° C. or less to form acicular goethite particles by the oxidation reaction. The second method is a method in which an aqueous ferrous salt solution is reacted with a carbonic acid alkali aqueous solution to thereby obtain a suspension containing $FeCO_3$, then an oxygen-containing gas is aerated to the suspension obtained to form spindle-like goethite particles by the oxidation reaction. The third method is a method in which an alkali hydroxide aqueous solution or a carbonic acid alkali aqueous solution is added to a ferrous salt aqueous solution in the amount of less than equivalent, thereby a ferrous salt aqueous solution containing ferrous hydroxide colloid is obtained, then an oxygen-containing gas is aerated to the ferrous salt aqueous solution obtained to form acicular goethite nucleus particles by the oxidation reaction, thereafter an alkali hydroxide aqueous solution is added to the ferrous salt aqueous solution containing the acicular goethite nucleus particles in the amount of equivalent or more based on $Fe^{2+}$ in the ferrous salt aqueous solution, and then again an oxygen-containing gas is aerated to the ferrous salt aqueous solution to grow the acicular goethite nucleus particles. The fourth method is a method in which an alkali hydroxide aqueous solution or a carbonic acid alkali aqueous solution is added to a ferrous salt aqueous solution in the amount of less than equivalent, thereby a ferrous salt aqueous solution containing ferrous hydroxide colloid is obtained, then an oxygen-containing gas is aerated to the ferrous salt aqueous solution obtained to form acicular goethite nucleus particles by the oxidation reaction, thereafter the acicular goethite nucleus particles are grown in an acidic or neutral region. Further, foreign elements such as Ni, Zn, P or Si, which are generally added to a reaction solution during a goethite particle-forming reaction to improve the properties of the particulate powder, may be added.

Acicular α-$Fe_2O_3$ particles can be obtained by dehydrating the acicular goethite particles, which are precursor particles, in the range of 200 to 500° C. and further, if necessary, annealing the particles by heat treatment at 350 to 800° C. A sintering inhibitor such as P, Si, B, Zr or Sb may be adhered to the surface of the acicular goethite particles to be dehydrated or annealed. The reason why annealing by heat treatment at 350 to 800° C. is conducted is because it is preferred to fill the voids which have occurred on the surface of acicular α-$Fe_2O_3$ particles obtained by the dehydration by melting the extreme surface of particles to obtain smooth surfaces.

The α-$Fe_2O_3$ particle powder for use in the present invention can be obtained by dispersing the acicular α-$Fe_2O_3$ particles obtained above by dehydration or annealing in an aqueous solution to make a suspension, adding an Al compound to the suspension and adjusting the pH, covering the surface of the acicular α-$Fe_2O_3$ particles with the above Al compound, and then filtering, washing, drying, pulverizing and, if necessary, performing deaeration and compaction. The aluminum compound to be used can be selected from an aluminum salt such as aluminum acetate, aluminum sulfate, aluminum chloride, and aluminum nitrate, and an aluminic acid alkali salt such as sodium aluminate. In this case, the addition amount of the Al compound is from 0.01 to 50 wt % in terms of Al based on the α-$Fe_2O_3$ particle powder. When the content is less than 0.01 wt %, dispersion in the binder resin is insufficient, and when the amount exceeds 50 wt %, the Al compound suspending around the surfaces of the particles unfavorably interact with each other.

The surface covering treatment can be performed using one or two or more selected from the group consisting of P, Ti, Mn, Ni, Zn, Zr, Sn and Sb, as well as Si compound, together with the Al compound. The content of these compounds used together with the Al compound is from 0.01 to 50 wt % based on the α-$Fe_2O_3$ powder. When the amount added is less than 0.01 wt %, the improvement of dispersibility by the addition can hardly be obtained, and when the amount exceeds 50 wt %, the Al compound suspending not around the surfaces of the particles unfavorably interact with each other.

The producing method of titanium dioxide for use in the lower coating layer is as follows. Titanium dioxides are produced mainly by a sulfuric acid process and a chlorine process. A sulfuric acid process comprises digesting raw ores of ilmenite with sulfuric acid and extracting Ti and Fe as sulfate. Iron sulfate is removed by crystallization-separation, the resulting titanyl sulfate solution is purified by filtration, water-containing titanium oxide is precipitated by thermal hydrolysis, the precipitated product is filtrated and washed, impurities are removed by washing, then a particle size-adjusting agent is added and calcined at 80 to 1,000° C., thereby a crude titanium oxide is obtained. A rutile type and an anatase type are separated by the kind of nucleating agent added at hydrolysis. This crude titanium oxide is pulverized, graded, and surface treated. In a chlorine process, natural rutile and synthetic rutile are used as raw ores. Ores are chlorinated in a high temperature reduction state, Ti becomes $TiCl_4$ and Fe becomes $FeCl_2$, and the iron oxide solidified by cooling is separated from the liquid $TiCl_4$. The crude $TiCl_4$ obtained is purified by rectification, then a nucleating agent is added thereto and reacted with oxygen instantaneously at 1,000° C. or more, thereby a crude titanium oxide is obtained. The finishing method for imparting the property of pigment to the crude titanium oxide formed in the oxidation decomposition process is the same as in the sulfuric acid process.

After the above titanium oxide material is dry ground, water and a dispersant are added, grains are wet ground, and coarse grains are classified by means of a centrifugal separator. Subsequently, a fine grain slurry is put in a surface treatment bath and surface covering with metal hydroxide is performed here. In the first place, a predetermined amount of an aqueous solution of salt of Al, Si, Ti, Zr, Sb, Sn or Zn is added to the tank, acid or alkali is added to neutralize the solution, and the surfaces of titanium oxide particles are covered with the hydroxide produced. The water-soluble salts by-produced are removed by decantation, filtration and washing, the pH of the slurry is adjusted finally and filtrated, and washed with pure water. The washed cake is dried using a spray drier or a band drier. The dried product is finally ground by jet milling, thereby the product is obtained. Besides the water system, it is also possible to perform surface treatment by introducing AlCl3 and $SiCl_4$ vapor to the titanium oxide powder, then water vapor is flowed to effect surface treatment. With respect to other producing methods of pigments, G. D. Parfitt and K. S. W. Sing, *Characterization of Powder Surfaces*, Academic Press (1976) can be referred to.

Carbon blacks may be used in combination with the nonmagnetic inorganic powders, and by the incorporation of carbon blacks into the lower coating layer, a desired micro Vickers' hardness can be obtained in addition to well-known effects of reducing surface electrical resistance (Rs) to thereby obtain an antistatic effect and lessening light transmittance. A microVickers' hardness of the lower coating layer is generally from 25 to 60 kg/$mm^2$ (about 245 to 588 MPa), preferably from 30 to 50 kg/$mm^2$ (about 294 to 490 MPa) to adjust the touch of the tape to the head. A micro Vickers' hardness is measured by means of a thin film hardness meter HMA-400 (manufactured by NEC Co., Ltd.) using a diamond-made triangular pyramid needle having an edge angle of 80° and a tip radius of 0.1 μm provided at the tip of an indenter.

As carbon blacks which can be used in the present invention, furnace blacks for rubbers, thermal blacks for rubbers, carbon blacks for coloring and acetylene blacks can be exemplified. These carbon blacks have a specific surface area ($S_{BET}$) of from 100 to 500 $m^2$/g, preferably from 150 to 400 $m^2$/g, a DBP absorption of from 20 to 400 ml/100 g, preferably from 30 to 200 ml/100 g, a primary particle size of from 10 to 80 nm, preferably from 10 to 50 nm, and more preferably from 10 to 40 nm, pH of from 2 to 10, a water content of from 0.1 to 10%, and a tap density of from 0.1 to 1 g/ml.

The specific examples of carbon blacks for use in the present invention include BLACKPEARLS 2000, 1300, 1000, 900, 800, 880 and 700, and VULCAN XC-72 (manufactured by Cabot Co., Ltd.), #3050B, #3150B, #3250B, #3750B, #3950B, #950, #650B, #970B and #850B, MA-600, MA-230, #4000 and #4010 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.). Carbon blacks for use in the present invention may be surface-treated in advance with a dispersant, may be grafted with a resin, or a part of the surface may be graphitized before use. Carbon blacks may be previously dispersed in a binder before addition to the coating solution.

These carbon blacks can be used within the range of from 5 to 49 wt % based on the nonmagnetic inorganic powders and not exceeding 40 wt % based on the total weight of the nonmagnetic layer. These carbon blacks can be used alone or in combination. Regarding the carbon blacks which can be used in the present invention, for example, compiled by Carbon Black Association, *Carbon Black Binran* (*Handbook of Carbon Blacks*), may be referred to.

Organic powders can be used in the lower coating layer according to the purpose. The examples of such organic powders include an acryl-styrene resin powder, a benzoguanamine resin powder, a melamine resin powder, and a phthalocyanine pigment. In addition, a polyolefin resin powder, a polyester resin powder, a polyamide resin powder, a polyimide resin powder, and a polyethylene fluoride resin powder can also be used. The producing methods of these powders are disclosed in JP-A-62-18564 and JP-A-60-255827.

Lubricants, dispersants, additives, solvents, dispersing methods and others used for the magnetic layer can be used in the lower coating layer. In particular, with respect to the amounts and the kinds of additives and dispersants, well-known prior art techniques regarding the magnetic layer can be applied to the lower coating layer.

In the next place, the cleaning layer is described below.

In the cleaning layer of the present invention, the surface of the cleaning layer preferably has from 5 to 80 protrusions having a height of from 35 to 100 nm per 900 $\mu m^2$, and the cleaning layer preferably contains fatty acid amide, fatty acid and fatty acid ester.

The present invention specifies the distribution of the protrusions on the surface of the cleaning layer and the lubricants for use in the cleaning layer.

In the present invention, the distribution of the protrusions on the surface of the cleaning layer is controlled such that the number of protrusions having a height of from 35 to 100 nm, preferably from 35 to 80 nm, is from 5 to 80, preferably from 5 to 60, per 900 $\mu m^2$.

The protrusion distribution in the present invention can be obtained by the following method using NANOSCOPE III (manufactured by DIGITAL INSTRUMENT), i.e., the area of about 30 $\mu m \times 30$ $\mu m$ is measured by contact mode, the plane where the volumes of the convexities and the concavities are equal is taken as the standard plane, protrusions are sliced at the level of 35 to 150 nm from the standard plane, and the number of the protrusions which are sliced or touched is counted.

A proper cleaning property to an MR head is given by virtue of the above range of the protrusion distribution. When the number of protrusions is not enough even if the heights of protrusions are within the above range, a cleaning property is reduced and the stain on an MR head cannot be removed, while when the protrusions are too many, head abrasion is great and an MR head is scratched after cleaning.

When ordinarily used lubricants are used, head abrasion becomes great even if the protrusion distribution is within the above range. By combining the cleaning layer with the lubricant having the specific composition of the present invention, the abrasion coefficient with a head becomes optimal and head abrasion can be reduced.

For controlling the protrusion distribution, i.e., the number and the height of protrusions, within the range of the present invention, the following means can be used but the present invention is not limited thereto.

1. Adjusting the sizes and the addition amounts of various powders which are added to the lower coating layer and/or the cleaning layer 2. Adjusting the calendering conditions of the lower coating layer, or the calendering conditions of the laminate comprising the lower coating layer and the cleaning layer The detailed conditions with respect to the above means are described later.

In the present invention, the cleaning layer contains fatty acid amide, fatty acid and fatty acid ester as the lubricants.

For example, as the fatty acid amide, fatty acid and fatty acid ester, the following compounds are exemplified.

As the fatty acid amide, fatty acid amides having from 8 to 22 carbon atoms are exemplified.

As the fatty acid, monobasic fatty acids having from 10 to 24 carbon atoms, and metal salts of them (e.g., with Li, Na, K, Cu) are exemplified.

As the fatty acid ester, esters of the above monobasic fatty acids having from 10 to 24 carbon atoms and alcohols having from 4 to 22 carbon atoms are exemplified.

Fatty acids and/or alcohols which are used in the above fatty acids, amides and esters of them may be saturated or unsaturated, straight chain or branched, or may have alicyclic rings. The fatty acids and/or alcohols may have alkoxyl groups, or may have alkylene oxide polymerization products or monoalkyl etherified products of them. The fatty acid esters may be monovalent esters, polyvalent esters, or may be preferably from monovalent to trivalent esters, and hydroxyl groups may remain in the latter case. The fatty acid amides may be monovalent amides or polyvalent amides, and carboxyl groups may remain in the latter case. These fatty acid amides, fatty acids and fatty acid esters are optimally selected from the relationship with the distribution of the protrusions on the surface of the cleaning layer. At least any of the fatty acid amides, fatty acids and fatty acid esters can be used in combination of two or more kinds.

The specific examples of these fatty acids and fatty acid esters include lauric acid, myristic acid, palmitic acid, stearic acid, behenic acid, oleic acid, linoleic acid, linolenic acid, elaidic acid, butyl stearate, octyl stearate, amyl stearate, isooctyl stearate, octyl myristate, butoxyethyl stearate, anhydro-sorbitan monostearate, anhydro-sorbitan distearate, and anhydro-sorbitan tristearate. Fatty acid amides derived from these fatty acids are used in the present invention.

The total use amount of the fatty acid amides, fatty acids and fatty acid esters in the cleaning layer is preferably from 0.1 to 10 weight parts per 100 weight parts of the ferromagnetic powder, more preferably from 0.5 to 5 weight parts. The optimal use amounts of the fatty acid amides, fatty acids and fatty acid esters are respectively arbitrarily divided based on the above range and appropriate amounts are selected. In general, the order in the amount of fatty acid amides $\leq$ fatty acid $\leq$ fatty acid esters is preferred.

As the inorganic powder contained in the cleaning layer, ferromagnetic powders are used, and as the ferromagnetic powders, well-known ferromagnetic powders, such as $\gamma$-FeO$_x$ (x is from 1.33 to 1.5), Co-modified $\gamma$-FeO$_x$ (x is from 1.33 to 1.5), ferromagnetic alloy powders containing $\alpha$-Fe or Ni or Co as a main component (75% or more), barium ferrite or strontium ferrite can be used. Ferromagnetic alloy powders containing $\alpha$-Fe as a main component are preferred. These ferromagnetic powders may contain, in addition to the prescribed atoms, the following atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B and Mg. In particular, when the ferromagnetic powders are metallic magnetic powders, Al, Si, Ca, Y, Ba, La, Nd, Co, Ni and B are preferred as the elements contained besides $\alpha$-Fe. Si, Al and Y are particularly preferred as a surface treating agent and a sintering inhibitor. Co is preferably added in an amount of from 2 to 40 wt % of Fe. Si, Al and Y are used in an amount of from 0 to 10 wt %. These ferromagnetic powders may be previously treated with the later-described dispersants, lubricants, surfactants and antistatic agents before dispersion. The specific examples of them are disclosed in JP-B-44-14090 (the term "JP-B" as used herein means an "examined Japanese patent publication"), JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-

18573, JP-B-39-10307, JP-B-48-39639, U.S. Pat. Nos. 3,026,215, 3,031,341, 3,100,194, 3,242,005 and 3,389,014.

Of the above ferromagnetic powders, the ferromagnetic alloy fine powders may contain a small amount of hydroxides or oxides. Ferromagnetic alloy fine powders prepared by well-known methods can be used, such as a method of reducing a composite organic acid salt (mainly an oxalate) with a reducing gas, e.g., hydrogen; a method of reducing iron oxide with a reducing gas, e.g., hydrogen, to obtain Fe or Fe—Co particles; a method of thermal decomposition of a metal carbonyl compound; a method of adding a reducing agent, e.g., sodium borohydride, hypophosphite, or hydrazine, to an aqueous solution of a ferromagnetic metal to effect reduction; and a method of evaporating a metal in a low pressure inert gas to obtain a fine powder. The thus-obtained ferromagnetic alloy powders which are subjected to well-known gradual oxidization treatment can be used in the present invention, e.g., a method of immersing the powders in an organic solvent, and then drying; a method of immersing the powders in an organic solvent, then charging an oxygen-containing gas to form oxide films on the surfaces of the powders and drying; and a method of forming oxide films on the surfaces of the powders by regulating partial pressure of an oxygen gas and an inert gas without using an organic solvent.

The ferromagnetic powders which are used in the cleaning layer of the present invention have a specific surface area ($S_{BET}$) as measured by the BET method of from 45 to 80 $m^2/g$, preferably from 50 to 70 $m^2/g$. When SBET is less than 45 $m^2/g$ or more than 80 $m^2/g$, good surface property is obtained with difficulty, which is not preferred. The ferromagnetic powders in the cleaning layer of the present invention have a crystallite size of from 300 to 100 Å, preferably from 250 to 100 Å, and more preferably from 200 to 140 Å.

The ferromagnetic powders have a saturation magnetization ($\sigma_s$) of preferably from 100 to 180 A·m²/kg, more preferably from 110 to 170 A·m²/kg, and still more preferably from 125 to 160 A·m²/kg. The ferromagnetic powders have a coercive force (Hc) of preferably from 500 to 3,000 Oe (about 40 to 240 kA/m). The ferromagnetic powders have a squareness ratio of preferably from 0.6 to 0.98. The magnetization amount of the cleaning layer is preferably from 30 to 300 mT·$\mu$m. The ferromagnetic powders have an acicular ratio of preferably from 4 to 18, and more preferably from 5 to 12. The ferromagnetic powders have a water content of preferably from 0.01 to 2%. The water content of ferromagnetic powders is preferably optimized by selecting the kinds of binders.

The pH of the ferromagnetic powders is preferably optimized by the combination with the binder to be used. The pH range is from 4 to 12, preferably from 6 to 10. The ferromagnetic powders may be surface-treated (-covered) with Al, Si, P or oxides of them, if necessary. The amount of them is from 0.1 to 10% based on the ferromagnetic powders. Adsorption of a lubricant, e.g., fatty acid, becomes 100 mg/m² or less by the surface treatment, which is preferred. Soluble inorganic ions (e.g., Na, Ca, Fe, Ni and Sr) are sometimes contained in the ferromagnetic powders. It is preferred substantially not to contain such soluble inorganic ions but the properties of the ferromagnetic powders are not particularly affected if the content is 200 ppm or less. The ferromagnetic powders for use in the present invention preferably have less voids and the value is preferably 20% by volume or less, more preferably 5% by volume or less.

Well-known thermoplastic resins, thermosetting resins, reactive resins and mixtures of these resins are used as a binder in the present invention. It is preferred to use polyurethane resins in combination. Thermoplastic resins having a glass transition temperature of from −100 to 150° C., a number average molecular weight of from 1,000 to 200,000, preferably from 10,000 to 100,000, and a polymerization degree of about 50 to 1,000 are used in the present invention.

The examples of these resins include polymers or copolymers containing as a constituting unit the following compounds, such as vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal and vinyl ether; polyurethane resins and various rubber resins. As the examples of thermosetting resins and reactive resins, phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyester polyol and polyisocyanate, and mixtures of polyurethane and polyisocyanate can be used. Details on these resins are described in *Plastic Handbook*, Asakura Shoten. It is also possible to use well-known electron beam-curable type resins in the lower coating layer and the upper cleaning layer.

The examples of these resins and the producing methods are disclosed in detail in JP-A-62-256219. These resins can be used alone or in combination. The examples of preferred combinations include at least one selected from vinyl chloride resins, vinyl chloride-vinyl acetate resins, vinyl chloride-vinyl acetate-vinyl alcohol resins, and vinyl chloride-vinyl acetate-maleic anhydride copolymers with polyurethane resins, or combinations of these resins with polyisocyanate.

As polyurethane resins, those having well-known structures can be used, e.g., polyester polyurethane, polyether polyurethane, polyether polyester polyurethane, polycarbonate polyurethane, polyester polycarbonate polyurethane, polycaprolactone polyurethane, and polyolefin polyurethane. Above all, a binder comprising a polyurethane resin which is a reaction product containing at least polyol and organic diisocyanate as the main starting materials, and the polyurethane resin contains, as the polyol components, a short chain diol component having a cyclic structure, a long chain polyether polyol component, and a polar group-containing long chain polyol component having a molecular weight of from 500 to 5,000 is preferred.

Preferably, at least one polar group selected from the following groups is introduced into the above binders by copolymerization or addition reaction for the purpose of further improving the dispersibility and the durability, e.g., —COOM, —$SO_3M$, —$OSO_3M$, —P=O(OM)$_2$, —O—P=O(OM)$_2$ (wherein M represents a hydrogen atom, or an alkali metal salt group), —OH, —$NR^2$, —$N^+R^3$ (R represents a hydrocarbon group) an epoxy group, —SH, —CN, sulfobetaine, phosphobetaine, or carboxybetaine. The content of the polar group is from $10^{-1}$ to $10^{-8}$ mol/g, preferably from $10^{-2}$ to $10^{-6}$ mol/g.

The specific examples of the binders for use in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100 and 400X-110A (manufactured by Nippon Zeon Co., Ltd.), Nippollan N2301, N2302 and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Chemicals and Ink. Co., Ltd.), Vylon UR8200, UR8300 and UR8600 (manufactured by Toyobo Co., Ltd.), Daipheramine 4020, 5020, 5100, 5300, 9020, 9022 and 7020 (manufactured by Dainichi Seika K.K.), MX5004 (manufactured by Mitsubishi Kasei Corp.), Sunprene SP-150, TIM-3003 and TIM-3005 (manufactured by Sanyo Chemical Industries Co. Ltd.), Salan F310 and F210 (manufactured by Asahi Chemical Industry Co., Ltd.), etc. Of these products, MR-104, MR-110, MPR-TAO, MPR-TA, UR-8200, UR8300 and TIM-3005 are preferred.

The total amount of the resin component and the curing agent (i.e., the binder) for use in the cleaning layer of the present invention is from 5 to 24 wt %, preferably from 8 to 22 wt %, based on the amount of the inorganic powders containing the ferromagnetic powder. The amount of the binder for use in the lower coating layer is preferably from 15 to 40 weight parts, more preferably from 20 to 30 weight parts, per 100 weight parts of the nonmagnetic powder. When vinyl chloride resins are used, the amount is from 5 to 30 wt %, when polyurethane resins are used, the amount is from 2 to 20 wt %, and when polyisocyanate is used, the amount is from 2 to 20 wt %, and it is preferred to use them in combination. Such constitution that the cleaning layer does not contain polyisocyanate and the lower coating layer contains polyisocyanate is particularly preferred in the present invention.

When polyurethane is used in the present invention, the polyurethane has a glass transition temperature of from −50 to 100° C., a breaking extension of from 100 to 2,000%, a breaking stress of from 0.05 to 10 kg/mm$^2$ (about 0.49 to 98 MPa), and a yielding point of from 0.05 to 10 kg/mm$^2$ (about 0.49 to 98 MPa).

The cleaning medium according to the present invention comprises two or more layers. Accordingly, the amount of the binder, the amounts of the vinyl chloride resins, polyurethane resins, polyisocyanates or other resins contained in the binder, the molecular weight of each resin constituting the cleaning layer, the amount of polar groups, or the physical properties of the above-described resins can of course be varied in the lower coating layer and the cleaning layer, according to necessity, and well-known techniques with respect to multilayer magnetic layers can be used in the present invention.

The examples of the polyisocyanates which can be used in the cleaning layer include isocyanates, e.g., tolylenediisocyanate, 4,4'-diphenylmethanediisocyanate, hexamethylenediisocyanate, xylylenediisocyanate, naphthylene-1,5-diisocyanate, o-toluidinediisocyanate, isophoronediisocyanate, and triphenylmethanetriisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR, and Millionate MTL (manufactured by Nippon Polyurethane Co., Ltd.), Takenate D-102, Takenate D-110N, Takenate D-200, and Takenate D-202 (manufactured by Takeda Chemical Industries, Ltd.), Desmodur L, Desmodur IL, Desmodur N, and Desmodur HL (manufactured by Sumitomo Bayer Co., Ltd.), and Burnock D-502 (manufactured by Dainippon Chemicals and Ink.). These products may be used alone or in combinations of two or more, taking advantage of a difference in curing reactivity in both of the lower coating layer and the upper cleaning layer.

The cleaning layer of the present invention may contain carbon blacks as the inorganic powders, e.g., furnace blacks for rubbers, thermal blacks for rubbers, carbon blacks for coloring and acetylene blacks. Carbon blacks for use in the present invention preferably have a specific surface area ($S_{BET}$) of from 5 to 500 m$^2$/g, a DBP oil absorption of from 10 to 400 ml/100 g, an average particle size of from 5 to 300 mμ, pH of from 2 to 10, a water content of from 0.1 to 10%, and a tap density of from 0.1 to 1 g/ml. The specific examples of carbon blacks for use in the present invention include BLACKPEARLS 2000, 1300, 1000, 900, 800 and 700, and VULCAN XC-72 (manufactured by Cabot Co., Ltd.), #80, #60, #55, #50 and #35 (manufactured by Asahi Carbon Co., Ltd.), #2400B, #2300, #5, #900, #950, #970, #1000, #30, #40 and #10B (manufactured by Mitsubishi Kasei Corp.), and CONDUCTEX SC, RAVEN 150, 50, 40 and 15 (manufactured by Columbia Carbon Co., Ltd.). Carbon blacks for use in the present invention may previously be surface-treated with a dispersant, may be grafted with a resin, or a part of the surface may be graphitized before use. Carbon blacks may be previously dispersed in a binder before addition to the coating solution of the cleaning layer. These carbon blacks may be used alone or in combination.

When carbon blacks are used, carbon blacks are preferably used in an amount of 5 wt % or less of the amount of the ferromagnetic powder. Carbon blacks can serve various functions such as preventing the static charge, reducing the friction coefficient, imparting the light-shielding property, and improving the film strength of the cleaning layer. These functions vary depending upon the kind of carbon blacks to be used. Accordingly, it is of course possible in the present invention to select and determine the kinds, the amounts and the combinations of the carbon blacks to be added to the cleaning layer and the lower coating layer, on the basis of the above described various properties such as the particle size, the oil absorption amount, the electroconductivity and the pH value.

The cleaning layer may contain abrasives as the inorganic powders. As the abrasive, well-known materials essentially having a Mohs' hardness of 6 or more may be used alone or in combination, e.g., α-alumina having an alpha-conversion rate of 90% or more, β-alumina, silicon carbide, chromiumoxide, ceriumoxide, α-ironoxide, corundum, artificial diamond, silicon nitride, silicon carbide, titanium carbide, titanium oxide, silicon dioxide, and boron nitride. Composites composed of these abrasives (abrasives obtained by surface-treating with other abrasives) may also be used. Compounds or elements other than the main component are often contained in these abrasives, but the intended effect can be attained so far as the content of the main component is 90% or more. The specific examples of abrasives include AKP-20, AKP-30, AKP-50, HIT-50, HIT-60, HIT-60A, HIT-70A, HIT-80, HIT-80G and HIT-100 (manufactured by Sumitomo Chemical Co., Ltd.), G5, G7 and S-1 (manufactured by Nippon Chemical Industrial Co., Ltd.), and TF100 and TF140 (manufactured by Toda Kogyo Co., Ltd.).

These abrasives preferably have a particle size of from 0.01 to 2 μm. If desired, a plurality of abrasives each having a different particle size may be used in combination, or a single abrasive having a broad particle size distribution may be used so as to attain the same effect as such a combination. The abrasives for use in the present invention preferably have a tap density of from 0.3 to 2 g/ml, a water content of from 0.1 to 5%, a pH value of from 2 to 11 and a specific surface area ($S_{BET}$) of from 1 to 30 m²/g. The shape of the abrasives to be used in the present invention may be any of acicular, spherical and die-like shapes. Preferably, the abrasives have a shape partly with edges, because a high cleaning property is given. The content of the abrasives as the inorganic powders is from 1 to 45 wt % per 100 wt % of the ferromagnetic powder. It is of course possible to select and determine the kinds, the amounts and the combinations of the abrasive to be added to the cleaning layer and the lower coating layer. The abrasives may be previously dispersed in a binder before addition to the magnetic coating solution. The number of the abrasives present on the surface of the cleaning layer and the end face of the cleaning medium of the present invention is preferably 5/100µm² or more.

As additives which can be used in the lower coating layer or the cleaning layer of the present invention, those having a lubricating effect, an antistatic effect, a dispersing effect and a plasticizing effect are used, e.g., molybdenum disulfide, tungsten graphite disulfide, boron nitride, graphite fluoride, silicone oil, polar group-containing silicons, fatty acid-modified silicons, fluorine-containing silicons, fluorine-containing alcohols, fluorine-containing esters, polyolefins, polyglycols, alkyl phosphates and alkali metal salts of them, alkyl sulfates and alkali metal salts of them, polyphenyl ethers, fluorine-containing alkyl sulfates and alkali metal salts of them, mono-, di-, tri-, tetra-, penta- or hexa-alcohols having from 12 to 22 carbon atoms (which may contain an unsaturated bond or may be branched), alkoxy alcohols having from 12 to 22 carbon atoms (which may contain an unsaturated bond or may be branched), and aliphatic amines having from 8 to 22 carbon atoms can be used.

In addition, nonionic surfactants such as alkylene oxides, glycerins, glycidols or alkylphenol-ethylene oxide adducts; cationic surfactants such as cyclic amines, ester amides, quaternary ammonium salts, hydantoin derivatives, heterocyclic compounds, phosphoniums or sulfoniums; anionic surfactants containing an acidic group such as carboxylic acid, sulfonic acid, phosphoric acid, sulfate groups or phosphate groups; and amphoteric surfactants such as amino acids, aminosulfonic acids, sulfates or phosphates of amino alcohols and alkylbetains. The details of these surfactants are described in *Kaimen Kasseizai Binran* (*Handbook of Surfactants*) (published by Sangyo Tosho Co., Ltd.). These lubricants and antistatic agents may not always be 100% pure and may contain impurities such as isomers, unreacted materials, byproducts, decomposed products and oxides, in addition to the main components. However, the content of such impurities is preferably 30% or less, more preferably 10% or less.

The kinds and amounts of these lubricants and surfactants for use in the lower coating layer and the cleaning layer can be properly selected in accordance with the purpose. For example, the lower coating layer and the cleaning layer can separately contain different fatty acids each having a different melting point so as to control bleeding out of the fatty acids to the surface, or different esters each having a different boiling point or a different polarity so as to control bleeding out of the esters to the surface. Also, the amounts of surfactants are controlled so as to improve the coating stability, or the amount of the lubricant in the lower coating layer is made larger so as to improve the lubrication effect. Examples are by no means limited thereto.

It is also preferred to add to the lower coating layer the fatty acid amide, fatty acid and fatty acid ester which are added to the cleaning layer.

All or a part of the additives to be used in the present invention may be added to a coating solution in any step of the preparation. For example, additives may be blended with an inorganic powder before the kneading step, may be added during the step of kneading an inorganic powder, a binder and a solvent, may be added during the dispersing step, may be added after the dispersing step, or may be added just before coating. According to the purpose, there is a case of capable of attaining the object by coating all or a part of the additives simultaneously with or successively after the coating of the cleaning layer. According to the purpose, lubricants maybe coated on the surface of the cleaning layer after the calendering treatment or after the completion of slitting.

The examples of commercially available lubricants which can be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160,NAA-173K, castor oil-hardened fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogri MB, Nonion DS-60, Anon BF, Anon LG, butyl stearate, butyl laurate and erucic acid (manufactured by Nippon Oils and Fats Co.); oleic acid (manufactured by Kanto Chemical Co.); FAL-205 and FAL-123 (manufactured by Takemoto Oils and Fats Co.); Enujerubu LO, Enujerubu IPM and Sansosyzer E4030 (manufactured by Shin Nihon Rika Co., Ltd.); TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935 (manufactured by Shin-Etsu Chemical Co.); Armide P, Armide C and Armoslip CP (manufactured by Lion Ahmer Co. Ltd.); Duomin TDO (manufactured by Lion Fat and Oil Co. Ltd.); BA-41G (manufactured by Nisshin Oil Mills Co., Ltd.); Profan 2012E, Newpole PE61, Ionet MS-400, Ionet MO-200, Ionet DL-200, Ionet DS-300, Ionet DS-1000 and Ionet DO-200 (manufactured by Sanyo Chemical Co. Ltd.).

The additives which can be used in the lower coating layer and the cleaning layer described are further described in detail belowe. That is, those having a lubrication effect, an antistatic effect, a dispersing effect and a plasticizing effect may be used. The examples of these additives include molybdenum disulfide, tungsten graphite disulfide, boron nitride, graphite fluoride, silicone oil, polar group-containing silicons, fatty acid-modified silicons, fluorine-containing silicons, fluorine-containing alcohols, fluorine-containing esters, polyolefins, polyglycols, alkyl phosphates and alkali metal salts of them, alkyl sulfates and alkali metal salts of them, polyphenyl ethers, fluorine-containing alkyl sulfates and alkali metal salts of them, monobasic fatty acids having from 10 to 24 carbon atoms (which may contain an unsaturated bond or which may be branched) and metal salts of them (e.g., with Li, Na, K or Cu), mono-, di-, tri-, tetra-, penta- or hexa-alcohols having from 12 to 22 carbon atoms (which may contain an unsaturated bond or may be branched), alkoxy alcohols having from 12 to 22 carbon atoms, mono-fatty acid esters, di-fatty acid esters or tri-fatty acid esters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid esters of monoalkyl ethers of alkylene oxide polymers, fatty acid amides having from 8 to 22 carbon atoms, and aliphatic amines having from 8 to 22 carbon atoms.

The specific examples of fatty acids for such additives include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydro-sorbitan distearate, anhydro-sorbitan tristearate, oleyl alcohol, and lauryl alcohol. In addition to the above, nonionic surfactants such as alkylene oxides, glycerins, glycidols and alkylphenolethylene oxide adducts; cationic surfactants such as cyclic amines, ester amides, quaternary ammonium salts, hydantoin derivatives, heterocyclic compounds, phosphoniums and sulfoniums; anionic surfactants containing an acidic group such as carboxylic acid, sulfonic acid, phosphoric acid, sulfate groups or phosphate groups; and amphoteric surfactants such as amino acids, aminosulfonic acids, sulfates or phosphates of amino alcohols and alkylbetains. The details of these surfactants are described in *Kaimen Kasseizai Binran* (*Handbook of Surfactants*) (published by Sangyo Tosho Co., Ltd.). These lubricants and antistatic agents are not always be 100% pure and may contain impurities such as isomers, unreacted materials, byproducts, decomposed products and oxides, in addition to the main components. However, the content of such impurities is preferably 30% or less, more preferably 10% or less.

Organic solvents for use in the lower coating layer and the cleaning layer may be used in an optional proportion. The examples of suitable organic solvents include ketones, e.g., acetone, methyl ethyl ketone, methyl isobutyl ketone, diisobutyl ketone, cyclohexanone, isophorone and tetrahydrofuran; alcohols, e.g., methanol, ethanol, propanol, butanol, isobutyl alcohol, isopropyl alcohol and methylcyclohexanol; esters, e.g., methyl acetate, butyl acetate, isobutyl acetate, isopropyl acetate, ethyl lactate and glycol acetate; glycol ethers, e.g., glycol dimethyl ether, glycol monoethyl ether and dioxane; aromatic hydrocarbons, e.g., benzene, toluene, xylene, cresol and chlorobenzene; chlorinated hydrocarbons such as methylene chloride, ethylene chloride, carbon tetrachloride, chloroform, ethylenechlorohydrin and dichlorobenzene; N,N-dimethylformamide and hexane. These organic solvents may not always be 100% pure and may contain impurities such as isomers, unreacted materials, byproducts, decomposed products, oxides and water, in addition to the main components. However, the content of such the impurities is preferably 30% or less, more preferably 10% or less.

The kinds of the organic solvents to be used in the cleaning layer and the lower coating layer of the present invention are preferably the same, however, the contents may be varied. For instance, a solvent having a high surface tension (for example, cyclohexanone or dioxane) is preferably used in the lower coating layer so as to improve the coating stability. Specifically, it is essential that the arithmetic mean value of the solvent composition of the cleaning layer be higher than that of the lower coating layer. For the purpose of improving the dispersibility, the polarity is preferably high in some degree. It is preferred that a solvent having electroconductivity of from 15 to 20 is contained in an amount of 50 wt % or more of the solvent composition. The solubility parameter is preferably from 8 to 11.

Concerning the constitution of the thickness of the cleaning tape of the present invention, the nonmagnetic support as thin as from 2.0 to 10 $\mu$m is effective. The total thickness of the cleaning layer and the lower coating layer is from $\frac{1}{100}$ to twice the thickness of the support. An adhesive layer may be provided between the nonmagnetic support and the lower coating layer for improving adhesion. The thickness of the adhesive layer is from 0.01 to 2 $\mu$m, preferably from 0.02 to 0.5 $\mu$m. Further, a back coat layer may be provided on the back surface of the support which is opposite to the side on which the cleaning layer is provided. The thickness of the back coat layer is from 0.1 to 2 $\mu$m, preferably from 0.3 to 1.0 $\mu$m. Well-known adhesive layers and back coat layers may be used as these adhesive layer and back coat layer.

The nonmagnetic supports for use in the present invention have a micro Vickers' hardness of 75 kg/mm$^2$ (about 735 MPa) or more, and well-known films can be used, e.g., biaxially oriented polyethylene terephthalate, polyethylene naphthalate, polyamide, polyimide, polyamideimide, aromatic polyamide, and polybenzoxazole. In particular, high strength nonmagnetic supports using Aramide resin or polyethylene naphthalate are preferred. These supports may be previously subjected to surface treatments, such as corona discharge treatment, plasma treatment, easy-adhesion treatment, heat treatment, and dust removing treatment.

For attaining the object of the present invention, it is preferred to use a nonmagnetic support having a central line average surface roughness (Ra) of from 0.5 to 7 nm of the surface on which the cleaning layer is provided. It is preferred that the support not only has a small central line average surface roughness but also is free from coarse protrusions having a height of 1 $\mu$m or more. The adjustment of the surface roughness configuration of the support can also be utilized for controlling the distribution of the protrusions, and the size and the amount of fillers added to the nonmagnetic support may be arbitrarily controlled for that purpose. As the examples of such fillers, crystalline or amorphous oxides or carbonates of Al, Ca, Si and Ti, and acryl-based and melamine-based organic fine powders can be exemplified. It is preferred that the surface roughness of the surface on which the back coat layer is coated is coarser than that of the surface on which the cleaning layer is coated. The central line average surface roughness of the surface on which the back coat layer is coated is preferably 1 nm or more, more preferably 4 nm or more. When the surface roughness of the side on which the cleaning layer is coated and that on which the back coat layer is coated are varied, a support having dual constitution may be used, alternatively the surface roughnesses may be varied by providing a coating layer.

The F-5 value of the nonmagnetic support in the running direction of the tape (MD direction) is preferably from 10 to 50 kg/mm$^2$ (about 98 to 490 MPa), and the F-5 value in the tape width direction (TD direction) is preferably from 10 to 30 kg/mm$^2$ (about 98 to 294 MPa). The F-5 value in the machine direction is in general higher than the F-5 value in the width direction, however, when the strength in the width direction is particularly required to be heightened, this rule does not apply to the case. The thermal shrinkage factor of the nonmagnetic support in the running direction and the width direction of the tape at 100° C. for 30 minutes is preferably 3% or less, more preferably 1.5% or less, and the thermal shrinkage factor at 80° C. for 30 minutes is preferably 1% or less, more preferably 0.5% or less. The nonmagnetic support has breaking strength in both directions of from 5 to 100 kg/mm$^2$ (about 49 to 980 MPa), Young's modulus of preferably from 100 to 3,000 kg/mm$^2$ (about 0.98 to 29.4 GPa), and light transmittance at 900 nm of preferably 30% or less, more preferably 3% or less.

Processes of preparing the coating solutions for the lower coating layer and the cleaning layer of the cleaning medium of the present invention comprise at least a kneading step, a dispersing step and, optionally, blending steps to be carried out before and after the kneading and dispersing steps. Respective steps may consist of two or more separate stages. Materials such as a ferromagnetic powder, a binder, a carbon black, an abrasive, an antistatic agent, a lubricant and a solvent for use in the present invention may be added at any step and at any time. Each material may be added at two or more steps dividedly. For example, polyurethane can be added dividedly at a kneading step, a dispersing step, or a blending step for adjusting viscosity after dispersion.

For achieving the object of the present invention, the above steps can be performed partly by conventionally well-known techniques. Powerful kneading machines such as a continuous kneader or a pressure kneader are preferably used in a kneading step. When a continuous kneader or a pressure kneader is used, all or a part of the binder (preferably 30% or more of the total binders) is kneading-treated in the range of from 15 parts to 500 parts per 100 parts of the ferromagnetic powder together with the ferromagnetic powder. Details of these kneading are disclosed in JP-A-1-166338 and JP-A-1-79274. When preparing the nonmagnetic layer solution of the lower coating layer, dispersing media having a high specific gravity are preferably used and zirconia beads are suitable for this purpose.

The following methods and apparatus are suggested for coating the cleaning medium having a multilayer construction of the present invention.

1. The lower coating layer is coated by any of gravure coating, roll coating, blade coating, and extrusion coating apparatus, which are ordinarily used in the coating of a magnetic coating solution, and the upper cleaning layer is coated while the lower coating layer is still wet by means of the support pressing type extrusion coating apparatus disclosed in JP-B-1-46186, JP-A-60-238179 and JP-A-2-265672.
2. The lower coating layer and the cleaning layer are coated almost simultaneously using the coating head equipped with two slits for feeding coating solution as disclosed in JP-A-63-88080, JP-A-2-17971 and JP-A-2-265672.
3. The lower coating layer and the cleaning layer are coated almost simultaneously using the extrusion coating apparatus equipped with a backup roll as disclosed in JP-A-2-174965.

For preventing the agglomeration of magnetic particles, it is preferred to impart shearing force to the coating solution in the coating head by the methods as disclosed in JP-A-62-95174 and JP-A-1-236968. With respect to the viscosity of the coating solution, the range of the numeric values disclosed in JP-A-3-8471 is necessary to be satisfied.

For obtaining the cleaning medium of the present invention, the ferromagnetic powder of the cleaning layer may be subjected to orientation. It is preferred to dispose a solenoid having a magnetic force of 100 mT or more and a cobalt magnet having a magnetic force of 200 mT or more with the same pole and counter position. It is also preferred to provide appropriate drying step before orientation so that the orientation after drying becomes highest.

It is also preferred to contrive to combine well-known means for improving adhesion, e.g., providing an adhesive layer comprising a polymer as a main component before simultaneous multilayer coating of the nonmagnetic lower coating layer and the cleaning layer, or performing corona discharging, performing UV irradiation or performing EB irradiation.

It is preferred to perform calendering treatment for adjusting the distribution of the protrusions on the surface of the cleaning layer. Heat resisting plastic rolls such as epoxy, polyimide, polyamide and polyimideamide can be used as calendering rolls. Treatment is also effected with only metal rolls. Treatment temperature is preferably from 50 to 100° C., more preferably from 80 to 100° C., line pressure is preferably from 100 to 500 kg/m (about 980 to 4,900 N/m), more preferably from 200 to 400 kg/m (about 1,960 to 3,920 N/m), and velocity is preferably from 50 to 400 m/min, more preferably from 100 to 300 m/min.

The surface of the cleaning layer and the opposite surface of the cleaning medium of the present invention have a friction coefficient to SUS420J of preferably from 0.1 to 0.5, more preferably from 0.2 to 0.3. The surface intrinsic resistivity of the cleaning layer is preferably from $10^4$ to $10^{12}$ Ω/sq, the modulus of elasticity at 0.5% elongation of the cleaning layer is preferably from 100 to 2,000 kg/mm$^2$ (about 0.98 to 19.6 GPa) both in the running direction and the transverse direction, and the breaking strength is preferably from 1 to 30 kg/mm$^2$ (about 9.8 to 294 MPa).

The cleaning medium as a whole has Young's modulus in the machine (MD) direction of from 300 to 1,200 kg/mm$^2$ (about 2.94 to 11.76 GPa), Young's modulus in the transverse (TD) direction of from 200 to 1,200 kg/mm$^2$ (about 1.96 to 11.76 GPa), and Young's modulus in the machine direction/Young's modulus in the transverse direction of from 1/2 to 2/1.

The residual elongation of the cleaning medium is preferably 0.5% or less, and the thermal shrinkage rate at every temperature of 100° C. or less is preferably 1% or less, more preferably 0.5% or less, most preferably 0.1% or less, and ideally 0%. The glass transition temperature of the cleaning layer (the maximum of modulus of elasticity loss by dynamic visco-elasticity measurement at 110 Hz) is preferably from 50° C. to 120° C., and that of the lower coating layer is preferably from 0° C. to 100° C. The modulus of elasticity loss is preferably within the range of from $1 \times 10^7$ to $8 \times 10^8$ Pa, and loss tangent is preferably 0.2 or less. If loss tangent is large, adhesion failure is liable to occur. The residual solvent amount in the cleaning layer is preferably 100 mg/m$^2$ or less, more preferably 10 mg/m$^2$ or less, and the residual solvent amount in the upper cleaning layer is preferably smaller than that in the lower coating layer. The void ratio is preferably 50% by volume or less, more preferably 40% by volume or less, with both of the lower coating layer and the cleaning layer.

When the magnetic characteristics of the cleaning layer of the cleaning medium according to the present invention are measured at the magnetic field of 10 kOe {Oe=(1/4π)kA/m} by a vibrating sample magnetometer (VSM), the coercive force Hc in the running direction of the tape is from 500 to 3,000 Oe (about 40 to 240 kA/m) and the squareness ratio is from 0.6 to 0.98, preferably 0.80 or more, and more preferably 0.85 or more. Two squareness ratios in the two directions making a right angle with the running direction of the tape are preferably 80% or less of the squareness ratio in the running direction. SFD (Switching Field Distribution) of the cleaning layer is preferably 0.6 or less, more preferably 0.5 or less, and ideally 0. Remanence coercive force Hr in the machine direction is also preferably from 1,800 to 3,000 Oe (about 144 to 240 kA/m). Hc and Hr in the vertical direction are preferably from 1,000 to 5,000 Oe (about 80 to 400 ka/m). The central line surface roughness of the cleaning layer (Ra) is preferably from 1.0 to 7.0 nm, but the value can be arbitrarily set according to purpose. It is preferred that the root mean surface roughness ($R_{RMS}$) of the cleaning layer which is measured with an AFM (atomic force microscope) is preferably from 2 to 15 nm.

The cleaning medium according to the present invention comprises the lower coating layer and the cleaning layer, and physical properties in the lower coating layer and the cleaning layer can be varied according to purposes. For example, the elastic modulus of the cleaning layer is made higher to improve running durability and at the same time the elastic modulus of the lower coating layer is made lower than that of the cleaning layer to improve the touch of the cleaning medium to the head. Further, it is effective in the present invention to improve the head touching by changing the tensilizing method of the support. In many cases, a support tensilized in the direction making a right angle with the machine direction of the tape rather shows good head touching.

EXAMPLE

The present invention will be described in detail with reference to the examples below. In the examples "parts" means "parts by weight" unless otherwise indicated.

Table I-1. The content of OH and the molecular weight of the obtained polyurethane resin are shown in Table I-1. The content of the polar group is shown in $10^{-5}$ eq/g. The content of OH of the polyurethane resin is shown by the number of OH group per one molecule computed from the number average molecular weight in terms of polystyrene found by using the OH value obtained according to the test method of JIS K0070 and GPC.

Synthesis Example I-2

Synthesis Example of Polyurethane Resin

Polyurethane resin P was synthesized according to the method disclosed in Example 1 of JP-A-1-267829 using the polyol obtained by the addition reaction of ethylene oxide to bisphenol A and 4,4-diphenylmethanediisocyanate as a polyisocyanate component. The results are shown in Table I-1.

TABLE I-1

| Polyurethane Resin | Short Chain Diol (wt %) | Long Chain Diol (wt %) | Polar Group-Containing Diol Compound | Amount (wt %) | Mw | MDI (wt %) | TMP (wt %) | Content of Ether (mmol/g) | Content of Polar Group (×10⁻⁵ eq/g) | OH Content/Molecule | Mn |
|---|---|---|---|---|---|---|---|---|---|---|---|
| A | HBpA (18) | Compound A (45) | I | 6 | 1,200 | 29 | 2 | 4.5 | 6.0 | 3 | 25,000 |
| B | HBpA (45) | Compound A (12) | I | 8 | 1,200 | 33 | 2 | 1.2 | 8.0 | 3 | 23,500 |
| C | HBpA (27) | Compound A (36) | II | 11 | 2,100 | 24 | 2 | 3.8 | 6.0 | 3 | 23,000 |
| D | HBpA (25) | Compound B (38) | II | 10 | 2,100 | 25 | 2 | 4.0 | 6.0 | 3 | 28,000 |
| E | HBpA (31) | Compound A (22) | III | 3.6 | 700 | 41.4 | 2 | 2.2 | 6.0 | 3 | 25,300 |
| F | HBpA (31) | Compound A (35) | III | 3.6 | 700 | 28.4 | 2 | 3.8 | 6.0 | 3 | 26,000 |
| G | HBpA (25) | Compound A (40) | III | 3.6 | 700 | 29.4 | 2 | 4.5 | 6.0 | 20 | 25,500 |
| H | HBpA (25) | Compound A (40) | III | 3.6 | 700 | 26.3 | 5.1 | 4.5 | 6.0 | 25 | 24,500 |
| I | HBpA (18) | Compound A (35) | III | 3.6 | 700 | 39.4 | 4 | 4.0 | 6.0 | 2 | 26,500 |
| J | HBpA (10) | Compound A (60) | III | 3.6 | 700 | 20.4 | 6 | 6.0 | 6.0 | 3 | 26,500 |
| K | HBpA (47) | Compound A ( 5) | IV | 6 | 5,000 | 40 | 2 | 0.1 | 1.0 | 3 | 25,000 |
| L | HBpA ( 8) | Compound B (64) | V | 6 | 6,000 | 20 | 2 | 8.7 | 1.0 | 3 | 24,800 |
| M | HBpA (18) | Compound C (55) | III | 3.6 | 700 | 21.4 | 2 | 5.0 | 6.0 | 3 | 23,400 |
| P | Bisphenol A-containing long chain diol 69%, Ether 8 mmol/g | | | | | | | | | | |

Example I

Synthesis Example I-1

Synthesis Example of Polyurethane Resin

Diols shown in Table I-1 were dissolved in cyclohexane at 60° C. under nitrogen gas flow in a reaction vessel equipped with a reflux condenser and a stirrer, the atmosphere of which had been previously replaced with nitrogen. Subsequently, di-n-butyltin laurate as a catalyst was added in an amount of 60 ppm to the total amount of the starting materials and the contents of the reaction vessel were dissolved for 15 minutes. MDI shown in Table I-1 was added thereto and a reaction was performed by heating at 90° C. for 2 hours, thereby a polyurethane prepolymer having NCO terminals was synthesized. The content of NCO of the obtained prepolymer was determined, trimethylolpropane was added thereto in the equimolar amount with the NCO content, and the reaction solution was further reacted by heating for 4 hours, thereby Polyurethane Resins A to J, L and M each having terminal branched OH were obtained. Polyurethane Resin K to which trimethylolpropane was not added was prepared in the same manner. The content of OH was adjusted by adjusting the content of MDI shown in The abbreviations shown in Table I-1 are as follows.

Short chain diol: a short chain diol component having a cyclic structure
HBpA: hydrogenated bisphenol A
Long chain diol: a long chain polyether polyol component
  Compound A: PO (propylene oxide) adduct of bisphenol A (molecular weight: 600), n is 3 to 4
  Compound B: PO (propylene oxide) adduct of bisphenol A (molecular weight: 1,000), n is 12 to 13
  Compound C: PO (propylene oxide) adduct of bisphenol A (molecular weight: 500), n is 3 to 4
Polar group-containing diol: a polar group-containing long chain polyol component
  I: SIS/IP/NPG polyester (molecular weight: 1,200)
  II: ε-Caprolactone adduct of DEIS (molecular weight: 2,100)
  III: Propylene oxide adduct of DEIS (molecular weight: 700)
  IV: SIS/BD/APA polyester (molecular weight: 5,000)
  V: SIS/BD/APA polyester (molecular weight: 6,000)
  SIS: Sodium 5-sulfoisophthalate
  DEIS: Ethylene oxide adduct of sodium 5-sulfoisophthalate NPG: Neopentyl glycol
IP: Isophthalic acid
BD: 1,4-Butanediol
APA: Adipic acid
MDI: 4,4-diphenylmethanediisocyanate
TMP: Trimethylolpropane Example I-1

Example I-1 is an example of a cleaning tape for an 8 mm video recorder comprising a cleaning layer and a lower coating layer formed by coating the coating solutions having the compositions shown below.

Coating Solution for Cleaning Layer

Ferromagnetic metal fine powder 100 parts
  Composition: Fe/Co=100/30
  Hc: 2,350 Oe (about 188 kA/m)
  Specific surface area ($S_{BET}$) by BET method: 49 m$^2$/g
  Crystallite size: 160 Å
  Surface-covering layer: $Al_2O_3$, $SiO_2$, $Y_2O_3$
  Average long axis length: 0.09 μm
  Acicular ratio: 7
  $\sigma_s$: 145 A·m$^2$/kg
Compound obtained by adding sodium 7.5 parts
  hydroxyethyl sulfonate to vinyl chloride/vinyl acetate/
    glycidyl
  methacrylate copolymer (86/9/5 by weight)
  (SO3Na=6×10$^{-5}$ eq/g, epoxy=10$^{-3}$ eq/g,
  Mw=30,000)
Polyurethane Resin A 6 parts The above composition was kneaded with 50 parts of cyclohexanone for 60 minutes, and then α-$Al_2O_3$ (average particle size: 0.15 μm) 15 parts dispersion solution
  Carbon black (average particle size: 0.08 μm) 0.5 parts
  Methyl ethyl ketone/toluene (1/1) 220 parts
were added thereto and the composition was dispersed with a sand mill for 120 minutes. Thereto were then added
  Polyisocyanate (Coronate 3041, manufactured 8 parts by Nippon Polyurethane Co., Ltd.)
  Butyl stearate 1 part
  Stearic acid 8 parts
  Methyl ethyl ketone 60 parts
and the composition was stirred for 20 minutes, filtered through a filter having an average pore diameter of 1 μm, thereby a cleaning layer coating solution was prepared.

Coating Solution for Lower Coating Layer

Nonmagnetic inorganic powder, α-$Fe_2O_3$ (hematite) 85 parts
  Average particle size: 0.13 μm
  $S_{BET}$: 55 m$^2$/g
  Surface-covering layer: $Al_2O_3$, $SiO_2$
  pH: 6.0 to 8.5

The above composition was pulverized with an open kneader for 10 minutes.

Compound obtained by adding sodium 7.5 parts
  hydroxyethyl sulfonate to vinyl chloride/vinyl acetate/
    glycidyl
  methacrylate copolymer (86/9/5 by weight)
  (SO$_3$Na=6×10$^{-5}$ eq/g, epoxy=10$^{-3}$ eq/g, Mw=30,000)
Polyurethane Resin A 6 parts The above composition was kneaded with 50 parts of cyclohexanone for 60 minutes, then Methyl ethyl ketone/cyclohexanone (6/4) 200 parts was added and the composition was kneaded for 60 minutes.

Thereto were then added
  Polyisocyanate (Coronate 3041, manufactured 8 parts by Nippon Polyurethane Co., Ltd.)
  Butyl stearate 1 part
  Stearic acid 8 parts
  Methyl ethyl ketone 60 parts
and the composition was stirred for 20 minutes, filtered through a filter having an average pore diameter of 1 μm, thereby a lower coating layer coating solution was prepared.

The above-obtained coating solutions were simultaneously multilayer-coated by reverse roll coating.

The lower coating layer coating solution was coated in a dry thickness of 2.0 μm, immediately thereafter the cleaning layer coating solution was coated on the lower coating layer in a dry thickness of 0.1 μm. The nonmagnetic support coated with the cleaning layer coating solution was subjected to orientation in the magnetic field with a 300 mT magnet while the cleaning layer coating solution was still wet. After drying, the coated layer was subjected to calendering treatment with calenders of 7 stages comprising a metal roll and an epoxy roll. The obtained web was cut in a width of 8 mm.

Examples I-2 to I-9

Samples of Examples I-2 to I-9 were prepared in the same manner as in Example I-1 except that Polyurethane Resin A used in the cleaning layer and the lower coating layer was replaced with the polyurethane resins shown in Table I-2.

Example I-10

A sample was prepared using the cleaning layer coating solution in Example I-1 in the same manner as in Example I-1 except that the nonmagnetic inorganic powder in the lower coating layer coating solution was replaced with titanium oxide.

Titanium oxide
  Average particle size: 0.035 μm
  Crystal system: rutile
  $TiO_2$ content: 90% or more
  Surface-covering layer: alumina
  $S_{BET}$: 40 m$^2$/g
  True specific gravity: 4.1
  pH: 7.0

Reference Examples I-1 to I-6

Samples were prepared in the same manner as in Example I-1 except that Polyurethane Resin A used in the cleaning layer and the lower coating layer was replaced with the polyurethane resins shown in Table I-2.

The properties of the tapes obtained are shown in Table I-2. The properties of the thus-obtained cleaning media in Examples and Reference Examples are shown in Table I-2.

The measuring method of each measured value is described below.

Central Line Average Surface Roughness (Ra):

Surface roughness (Ra) of the area of about 250 μm×250 μm of the surface of each sample was measured using "TOPO3D" (a product of WYKO, U.S.A.). The wavelength of measurement is about 650 nm and spherical compensation and cylindrical compensation were applied. Measurement was performed using a light interference type non-contact surface roughness meter.

Head Abrasion:

Each cleaning tape sample was run on Hi-8 Deck EV-S900 at 23° C. 70% RH for 10 minutes, the heights of the head before and after running were measured and the head abrasion value per 1 minute was computed.

Head Cleaning Property:

The output of EV-S900 was measured in advance using Hi-8 Super DC P6-120 (manufactured by Fuji Photo Film Co., Ltd.). Thereafter, a standard tape formed for the purpose of causing clogging was run on EV-S900, the condition of the head was observed using a stroboscope, and running was stopped at the point when stain was sufficiently adhered on the head and it was confirmed that output was nil. Subsequently each cleaning tape sample was run for 1 minute, the output was measured using Hi-8DC P6-120 recorded in advance, and the difference dB between the output measured in the last place and the output measured in the first place was taken as the evaluation of the head cleaning property. Further, head scratch after running of cleaning tape was observed.

In the cleaning medium according to the present invention comprising a nonmagnetic support having provided thereon a lower coating layer mainly containing a nonmagnetic inorganic powder and a binder, and a cleaning layer containing at least a ferromagnetic inorganic powder and a binder provided on the lower coating layer, the binder in the lower coating layer is a polyurethane resin which is a reaction product containing polyol and organic diisocyanate as main starting materials, and a polar group derived from polyol is contained in the polyurethane resin by specifying the polyol component, as a result a cleaning medium for a magnetic head which is high in cleaning property to a magnetic head, hardly generates scratches on a magnetic head, and causes less head abrasion can be obtained.

Example II

Preparation of Polyurethane Resin A

Diol (wt % is based on the value of the formed polyurethane) shown in Table II-1 was dissolved in cyclo-

TABLE I-2

| Sample | Polyurethane Resin | Short Chain Diol (wt %) | Long Chain Diol (wt %) | Content of Ether (mmol/g) | Mol. Wt. of Polar Group-Containing Diol | Content of OH (number/molecule) | Ra (nm) | Head Abrasion (μm/min) | Head Cleaning Property Output (dB) | Head Scratch |
|---|---|---|---|---|---|---|---|---|---|---|
| Example I-1 | A | 18 | 45 | 4.5 | 1,200 | 3 | 2.0 | 0.01 | 0 | absent |
| Example I-2 | B | 45 | 12 | 1.2 | 1,200 | 3 | 2.3 | 0.02 | −0.1 | absent |
| Example I-3 | C | 27 | 36 | 3.8 | 2,100 | 3 | 2.2 | 0.01 | −0.2 | absent |
| Example I-4 | D | 25 | 38 | 4.0 | 2,100 | 3 | 2.0 | 0.01 | 0 | absent |
| Example I-5 | E | 31 | 22 | 2.2 | 700 | 3 | 2.1 | 0.02 | −0.1 | absent |
| Example I-6 | F | 31 | 35 | 3.8 | 700 | 3 | 2.4 | 0.01 | −0.1 | absent |
| Example I-7 | G | 25 | 40 | 4.5 | 700 | 20 | 2.3 | 0.02 | −0.2 | absent |
| Example I-8 | H | 25 | 40 | 4.5 | 700 | 25 | 2.5 | 0.01 | 0 | absent |
| Example I-9 | I | 18 | 35 | 4.0 | 700 | 2 | 2.2 | 0.02 | −0.1 | absent |
| Example I-10 | A | 18 | 45 | 4.5 | 1,200 | 3 | 2.0 | 0.01 | −0.2 | absent |
| Reference Example I-1 | J | 10 | 60 | 6.0 | 700 | 3 | 2.9 | 0.04 | −1.5 | absent |
| Reference Example I-2 | K | 47 | 5 | 0.1 | 5,000 | 3 | 3.2 | 0.06 | −1.8 | present |
| Reference Example I-3 | L | 8 | 64 | 8.7 | 6,000 | 3 | 3.6 | 0.03 | −0.8 | absent |
| Reference Example I-4 | M | 18 | 55 | 5.0 | 700 | 3 | 3.5 | 0.08 | −1.3 | present |
| Reference Example I-5 | P | 0 | 69 | 8.0 | | 2 | 3.3 | 0.06 | −2.0 | present |
| Reference Example I-6 | J | 10 | 60 | 5.5 | 700 | 3 | 3.5 | 0.05 | −2.5 | present |

It can be understood from the results in Table I-2 that the sample in Reference Example I-1 is poor in the content of short chain diol and rich in the content of long chain diol, as a result the coated film is too soft and sufficient head cleaning property cannot be obtained. The sample in Reference Example I-2 is rich in the content of short chain diol and poor in the content of long chain diol, as a result the solubility of the polyurethane in the solvent is reduced, and so the dispersibility of the nonmagnetic inorganic powder is reduced, the surface property of the cleaning layer is reduced, head abrasion increases and scratches are generated on the head. The samples in other reference examples using the polyurethane resins other than the polyurethane of the present invention are also inferior to the samples according to the present invention in head abrasion resistance and cleaning property as compared with the samples of the present invention.

The samples in Examples I-1 to I-10 are not excess in head abrasion, have good cleaning property and excellent ME interchangeability, scratches are not generated on the heads, thus good results as the cleaning media for magnetic heads can be obtained.

hexane at 60° C. under nitrogen gas flow in a reaction vessel equipped with a reflux condenser and a stirrer, the atmosphere of which had been previously replaced with nitrogen. Subsequently, di-n-butyltin laurate as a catalyst was added in an amount of 60 ppm to the total amount of the starting materials and the contents of the reaction vessel were dissolved for 15 minutes. MDI shown in Table II-1 was added thereto and a reaction was performed by heating at 90° C. for 2 hours, thereby a polyurethane prepolymer having NCO terminals was synthesized. The content of NCO of the obtained prepolymer was determined, trimethylolpropane was added thereto in the equimolar amount with the NCO content, and the reaction solution was further reacted by heating for 4 hours, thereby Polyurethane Resin A having terminal branched OH was obtained. The content of OH was adjusted by adjusting the content of MDI. The contents of ether, polar group, OH and the number average molecular weight Mn of the obtained polyurethane resin are shown in Table II-1. The content of OH of the polyurethane resin is shown by the number of OH group per one molecule computed from the number average molecular weight in terms of polystyrene obtained by using the OH value obtained according to the test method of JIS K0070 and GPC.

TABLE II-1

| Polyurethane Resin A | | | | |
|---|---|---|---|---|
| Short Chain Diol Component Having a Cyclic Structure (wt %) | Long Chain Polyether Polyol Component (wt %) | Polar Group-containing Long Chain Polyol Component | | |
| | | Compound | Content (wt %) | Mw |
| HBpA (18) | Compound A (45) | I | 6 | 1,200 |

| MDI (wt %) | TMP (wt %) | Ether Content (mmol/g) | Polar Group Content (x $10^{-5}$ eq/g) | OH Content/ Molecule | Mn |
|---|---|---|---|---|---|
| 29 | 2 | 4.5 | 6.0 | 3 | 25,000 |

The abbreviations shown in Table II-1 are as follows.

A short chain diol component having a cyclic structure
HBpA: hydrogenated bisphenol A
A long chain polyether polyol component
Compound A: PO (propylene oxide) adduct of bisphenol A (molecular weight: 600), n is 3 to 4
A polar group-containing long chain polyol component
I: SIS/IP/NPG polyester (molecular weight: 1,200)
SIS: Sodium 5-sulfoisophthalate
IP: Isophthalic acid
NPG: Neopentyl glycol
MDI: 4,4-diphenylmethanediisocyanate
TMP: Trimethylolpropane

Example II-1

Example II-1 is an example of a cleaning tape for an 8 mm video recorder comprising a cleaning layer and a lower coating layer formed by coating the coating solutions having the compositions shown below.

Coating solution for cleaning layer
Ferromagnetic metal fine powder 100 parts
Composition: Fe/Co=100/30
Hc: 2,350 Oe (about 188 kA/m)
Specific surface area ($S_{BET}$) by BET method: 49 $m^2$/g
Crystallite size: 160 Å
Surface-covering layer: $Al_2O_3$, $SiO_2$, $Y_2O_3$
Average long axis length: 0.09 μm
Acicular ratio: 7
$\sigma_s$: 145 A·$m^2$/kg
Compound obtained by adding sodium 7.5 parts hydroxyethyl sulfonate to vinyl chloride/vinyl acetate/ glycidyl
methacrylate copolymer (86/9/5 by weight)
($SO_3Na=6\times10^{-5}$ eq/g, epoxy=$10^{-3}$ eq/g, Mw=30,000)
Polyurethane Resin A 6 parts The above composition was kneaded with 50 parts of cyclohexanone for 60 minutes, and then
α-$Al_2O_3$ (average particle size: 0.15 μm) 15 parts dispersion solution
Carbon black (average particle size: 0.08 μm) 0.5 parts
Methyl ethyl ketone/toluene (1/1) 220 parts
were added thereto and the composition was dispersed with a sand mill for 120 minutes. Thereto were then added
Polyisocyanate (Coronate 3041, manufactured 8 parts by Nippon Polyurethane Co., Ltd.)
Lubricant
Butyl stearate 4 parts
Stearic acid 1 part
Stearic acid amide 1 part
Solvent
Methyl ethyl ketone 60 parts
and the composition was stirred for 20 minutes, filtered through a filter having an average pore diameter of 1 μm, thereby a cleaning layer coating solution was prepared.

Coating solution for lower coating layer
Nonmagnetic inorganic powder, α-$Fe_2O_3$ (hematite) 85 parts
Average particle size: 0.13 μm
$S_{BET}$: 55 $m^2$/g
Surface-covering layer: $Al_2O_3$, $SiO_2$
pH: 6.0 to 8.5

The above composition was pulverized with an open kneader for 10 minutes.
Compound obtained by adding sodium hydroxyethyl 7.5 parts
sulfonate to vinyl chloride/vinyl acetate/glycidyl methacrylate copolymer (86/9/5 by weight)
($SO_3Na=6\times10^{-5}$ eq/g, epoxy=$10^{-3}$ eq/g, Mw=30,000)
Polyurethane Resin A 6 parts
The above composition was kneaded with 50 parts of cyclohexanone for 60 minutes, then
Methyl ethyl ketone/cyclohexanone (6/4) 200 parts
was added and the composition was kneaded for 60 minutes.

Thereto were then added
Polyisocyanate (Coronate 3041, manufactured 8 parts by Nippon Polyurethane Co., Ltd.)
Butyl stearate 4 parts
Stearic acid amide 1 part
Stearic acid 3 parts
Methyl ethyl ketone 60 parts and the composition was stirred for 20 minutes, filtered through a filter having an average pore diameter of 1 μm, thereby a lower coating layer coating solution was prepared.
The above-obtained coating solutions were simultaneously multilayer-coated by reverse roll coating. The lower coating layer coating solution was coated in a dry thickness of 2.0 μm, immediately thereafter the cleaning layer coating solution was coated on the lower coating layer in a dry thickness of 0.1 μm. The nonmagnetic support coated with the cleaning layer coating solution was subjected to orientation in the magnetic field with a 300 mT magnet while the cleaning layer coating solution was still wet. After drying, the coated layer was subjected to calendering treatment with calenders of 7 stages comprising a metal roll and an epoxy roll. The obtained web was cut in a width of ½ inches.

Examples II-2 to II-5

Samples were prepared in the same manner as in Example II-1 except for changing the calendering conditions.

Reference Examples II-1 to II-6

Samples were prepared in the same manner as in Example II-1 except for changing the kinds and the part numbers of the solvents in the cleaning layer coating solution to the kinds and the part numbers shown in Tables I-2.

Reference Examples II-7 and II-8

Samples were prepared in the same manner as in Example II-1 except for changing the calendering conditions.

The properties of the tapes obtained are shown in Table II-2. The properties of the thus-obtained cleaning media in Examples and Reference Examples are shown in Table II-2.

The measuring method of each measured value is described below.

Head Abrasion

Each cleaning tape sample was run on LTO (Ultrium) Drive (using an MR head) (manufactured by IBM) at 23° C. 70% RH for 1 hour, the heights of the MR head before and after running were measured and the head abrasion value per 10 minutes was computed.

Head Cleaning Property

The output of IBM LTO Ultrium Drive was measured in advance using LTO Ultrium 1 data cartridge (model LTO FB UL-1 100G E, manufactured by Fuji Photo Film Co., Ltd.). Thereafter, a standard tape formed for the purpose of causing clogging was run on IBM LTO Ultrium Drive, the condition of the head was observed using a stroboscope, and running was stopped at the point when stain was sufficiently adhered on the head and it was confirmed that output was nil. Subsequently each cleaning tape sample was run for 1 minute, the output was measured using LTO Ultrium 1 data cartridge (model LTO FB UL-1 100G E, manufactured by Fuji Photo Film Co., Ltd.) recorded in advance, and the difference dB between the output measured in the last place and the output measured in the first place was taken as the evaluation of the head cleaning property. Further, head scratch after running of cleaning tape was observed.

It can be seen from the results in Table II-2 that the samples in the examples in which the protrusion distributiona and the lubricant both satisfy the conditions of the present invention are less in the head abrasion, show high head cleaning property and cause scratches on the head.

The present invention can provide a cleaning medium for a magnetic recording apparatus which has high cleaning power to an MR head, does not generate scratch on a magnetic head, and does not abrade a head due to the constitution of the present invention that the surface of the cleaning layer has from 5 to 80 protrusions having a height of from 35 to 100 nm per 900 $\mu m^2$, and the cleaning layer contains fatty acid amide, fatty acid and fatty acid ester.

The entitle disclosure of each and every foreign patent application from which the benefit of foreign priority has been claimed in the present application is incorporated herein by reference, as if fully set forth herein.

While the invention has been described in detail and with reference to specific examples thereof, it will be apparent to one skilled in the art that various changes and modifications can be made therein without departing from the spirit and scope thereof.

What is claimed is:

1. A cleaning medium in the form of a tape constructed to clean a head of a magnetic recording apparatus as it slides along the head, comprising: a nonmagnetic support having provided thereon lower coating layer mainly containing a nonmagnetic inorganic powder and a binder, and a cleaning layer constructed to remove debris from a recording head as it slides along the head containing at least a ferromagnetic inorganic powder and a binder provided on the lower coating layer, wherein the thickness of the cleaning layer is from 0.05 to 1.0 $\mu m$, the thickness of the lower coating layer is from 0.2 to 5.0 $\mu m$, the thickness of the support is from 2.0 to 10 $\mu m$, the total thickness of the cleaning medium is from

TABLE II-2

| Sample | Lubricant (part) | protrusion distribution (number/900 $\mu m^2$) | Head Abrasion ($\mu m$/10 min) | Head Cleaning Property, Output (dB) | Head Scratch |
|---|---|---|---|---|---|
| Example II-1 | Stearic acid/butyl stearate/stearic acid amide (1/4/1) | 15 | 0.01 | 0 | absent |
| Example II-2 | Stearic acid/butyl stearate/stearic acid amide (1/4/1) | 5 | 0.01 | −0.1 | absent |
| Example II-3 | Stearic acid/butyl stearate/stearic acid amide (1/4/1) | 30 | 0.02 | −0.2 | absent |
| Example II-4 | Stearic acid/butyl stearate/stearic acid amide (1/4/1) | 50 | 0.03 | 0 | absent |
| Example II-5 | Stearic acid/butyl stearate/stearic acid amide (1/4/1) | 80 | 0.05 | 0 | absent |
| Reference Example II-1 | Stearic acid/butyl stearate/stearic acid amide (1/4/1) | 15 | 1.0 | −1.2 | present |
| Reference Example II-2 | Stearic acid (1) | 15 | 1.5 | −1.6 | present |
| Reference Example II-3 | Stearic acid amide (1) | 15 | 0.5 | −0.8 | Present |
| Reference Example II-4 | Stearic acid/butyl stearate (1/4) | 15 | 0.2 | −0.6 | Present |
| Reference Example II-5 | Butyl stearate/stearic acid amide (4/1) | 15 | 0.8 | −1.0 | Present |
| Reference Example II-6 | Stearic acid/stearic acid amide (1/1) | 15 | 0.7 | −1.3 | present |
| Reference Example II-7 | Stearic acid/butyl stearate/stearic acid amide (1/4/1) | 100 | 0.2 | −1.5 | present |
| Reference Example II-8 | Stearic acid/butyl stearate/stearic acid amide (1/4/1) | 150 | 1.0 | −2.0 | present |

4.0 to 15 µm, the surface of the cleaning layer has from 5 to 80 protrusions having a height of from 35 to 100 nm per 900 µm² and the cleaning layer contains fatty acid amide, fatty acid and fatty acid ester.

2. The cleaning medium for a magnetic recording apparatus as claimed in claim 1, wherein the binder in the lower coating layer comprises a polyurethane resin which is a reaction product containing polyol and organic diisocyanate as the main starting materials, and the polyurethane resin contains, as the polyol components, from 15 to 40 wt % of a short chain diol component having a cyclic structure, from 10 to 50 wt % of a long chain polyether polyol component, and a polar group-containing long chain polyol component having a molecular weight of from 500 to 5,000.

3. The cleaning medium for a magnetic recording apparatus as claimed in claim 2, wherein the polar group-containing long chain polyol component in the polyurethane resin contains polar groups in an amount of from $1 \times 10^{-5}$ eq/g to $2 \times 10^{-4}$ eq/g based on the polyurethane resin.

4. The cleaning medium for a magnetic recording apparatus as claimed in claim 2, wherein the polar group-containing long chain polyol component contains at least one polar group selected from the group consisting of —$SO_3M$, —$OSO_3M$, —$COOM$, —$PO_3M_2$, —$OPO_3M_2$, —$NR_2$ and —$N^+R_2R'COO^-$ (wherein M represents a hydrogen atom, an alkali metal, an ammonium, and R and R' each represents an alkyl group having from 1 to 12 carbon atoms).

5. The cleaning medium for a magnetic recording apparatus as claimed in claim 2, wherein the polyurethane resin has from 3 to 20 OH groups per one molecule.

6. The cleaning medium for a magnetic recording apparatus as claimed in claim 2, wherein the cleaning layer is formed on the lower coating layer by a wet-on-wet coating method while the lower coating layer is still wet.

* * * * *